United States Patent [19]

Karamon et al.

[11] Patent Number: 5,055,939

[45] Date of Patent: Oct. 8, 1991

[54] METHOD SYSTEM & APPARATUS FOR SYNCHRONIZING AN AUXILIARY SOUND SOURCE CONTAINING MULTIPLE LANGUAGE CHANNELS WITH MOTION PICTURE FILM VIDEO TAPE OR OTHER PICTURE SOURCE CONTAINING A SOUND TRACK

[76] Inventors: John J. Karamon, 19 Berkeley St., Stamford, Conn. 06902; Daniel W. Gravereaux, 602 Carter St., New Canaan, Conn. 06840

[21] Appl. No.: 282,305

[22] Filed: Dec. 9, 1988

Related U.S. Application Data

[63] Continuation-in-part of Ser. No. 132,295, Dec. 15, 1987, Pat. No. 4,839,733.

[51] Int. Cl.⁵ .......................................... H04N 5/76
[52] U.S. Cl. .................................... 358/341; 360/13; 360/61; 369/70
[58] Field of Search ............... 358/343, 311, 335, 341, 358/198; 352/31, 131; 369/54, 58, 43, 70, 83, 84, 85; 360/13, 14.1, 14.3, 15, 31, 79, 80, 61, 38.1, 33.1, 26; 364/821, 920.4

[56] References Cited

U.S. PATENT DOCUMENTS

| | | | |
|---|---|---|---|
| 2,693,127 | 11/1954 | Ortman | 88/12.2 |
| 2,925,753 | 2/1960 | Schwartz et al. | 88/28 X |
| 3,051,042 | 8/1962 | Maurer | 88/24 X |
| 3,492,068 | 1/1970 | Baron | 352/12 X |
| 3,498,702 | 3/1970 | Meninger et al. | 352/12 |
| 3,620,609 | 11/1971 | John, Jr. | 352/17 X |
| 3,664,735 | 5/1972 | Metzger | 352/24 X |
| 3,826,566 | 7/1974 | Csontos | 352/12 X |
| 3,832,045 | 8/1974 | Wilson et al. | 352/25 |
| 3,900,251 | 8/1975 | Doyle et al. | 352/12 X |
| 3,932,032 | 1/1976 | Weinstein | 352/11 |
| 3,979,774 | 9/1976 | Chen et al. | 360/80 |
| 4,027,958 | 6/1977 | Shigeta et al. | 353/26 A |
| 4,075,668 | 2/1978 | Keach | 360/80 |
| 4,110,017 | 8/1978 | McCormack et al. | 352/5 |
| 4,204,751 | 5/1980 | Game et al. | 352/12 X |
| 4,313,135 | 1/1982 | Cooper | 358/149 |
| 4,446,488 | 5/1984 | Suzuki | 358/343 |
| 4,461,552 | 7/1984 | Levine | 352/27 |
| 4,468,710 | 8/1984 | Hashimoto et al. | 360/9.1 X |
| 4,547,816 | 10/1985 | Sochor | 360/19.1 |
| 4,575,772 | 3/1986 | Shimada et al. | 360/19.1 |
| 4,600,280 | 7/1986 | Clark | 352/37 |
| 4,703,355 | 10/1987 | Cooper | 358/149 |
| 4,758,908 | 7/1988 | James | 360/61 |
| 4,839,733 | 6/1989 | Karamon et al. | 360/13 |

*Primary Examiner*—Donald McElheny, Jr.
*Attorney, Agent, or Firm*—Parmelee, Bollinger & Bramblett

[57] ABSTRACT

Method, system and apparatus correlate an audio message of an auxiliary sound source with an audio message from a sound track of motion picture film, video tape or other picture source with accompanying audio message track. This auxiliary source contains multiple language channels (also called "translation tracks" or "translation sound channels") running synchronously with each other. One such channel is a "prime language channel" including an audio message carrying the same information (possibly higher quality) in the same language as the message in the track accompanying the motion picture. This prime channel is derived from the same "master recording" (or high quality duplicate thereof) as the track accompanying the motion picture. Consequently the audio message conveyed by the prime channel (at high quality) is the same audio message conveyed by the motion picture track, but signals carrying those two messages may be quite different from each other: digital signal versus analog signal. Inherent characteristics, e.g., "syllabic structure", "absolute value envelope", of the two messages (not the signals themselves) are used for correlation to achieve synchronization. Having synchronized the prime channel with motion picture track by message correlation, other language channels automatically become synchronized with the track. Consequently, their articulation as heard corresponds with lip-motions seen in the motion picture. An audience (or its segments) may select any desired available language while viewing the motion picture. The correlation system notes any sound track breaks for providing corresponding fast-forward jumps in all language channels during subsequent picture presentations.

37 Claims, 9 Drawing Sheets

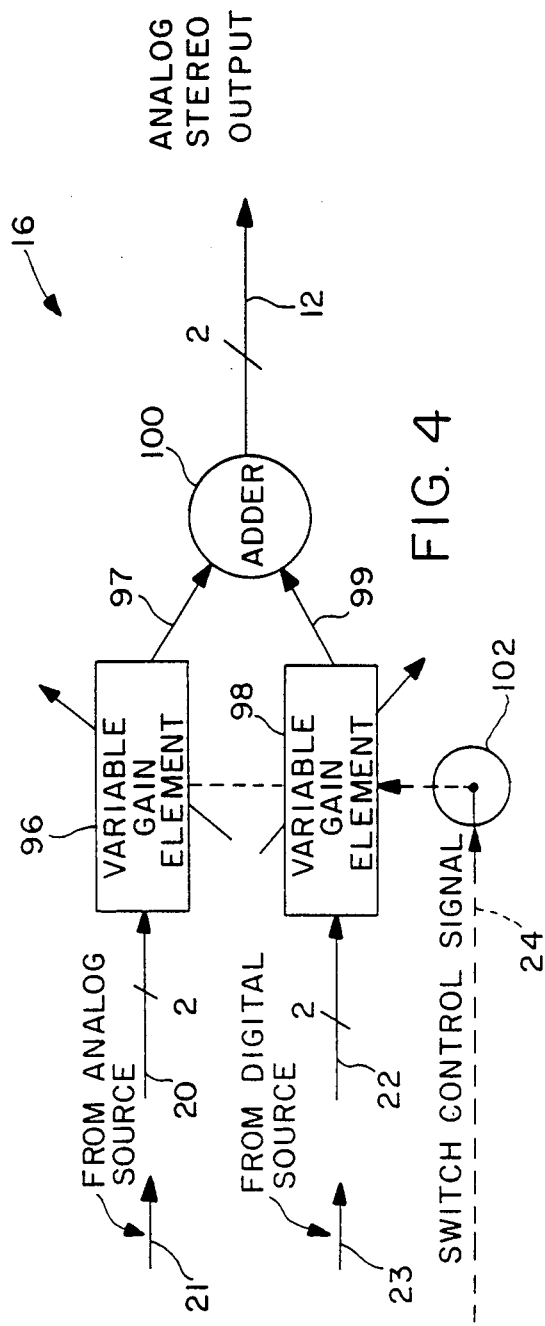
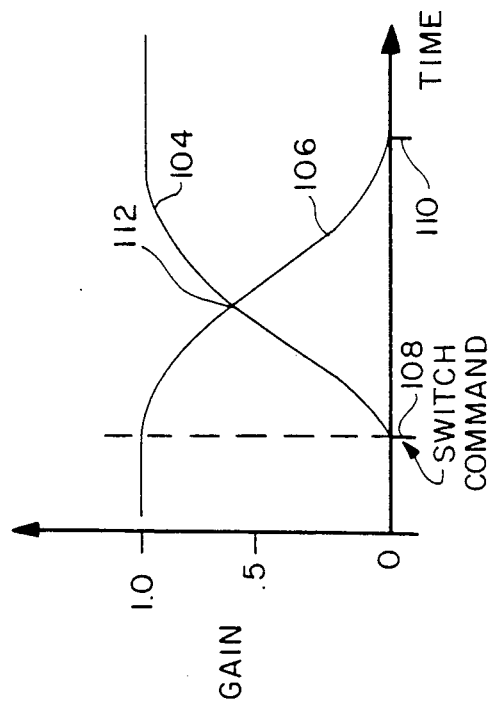

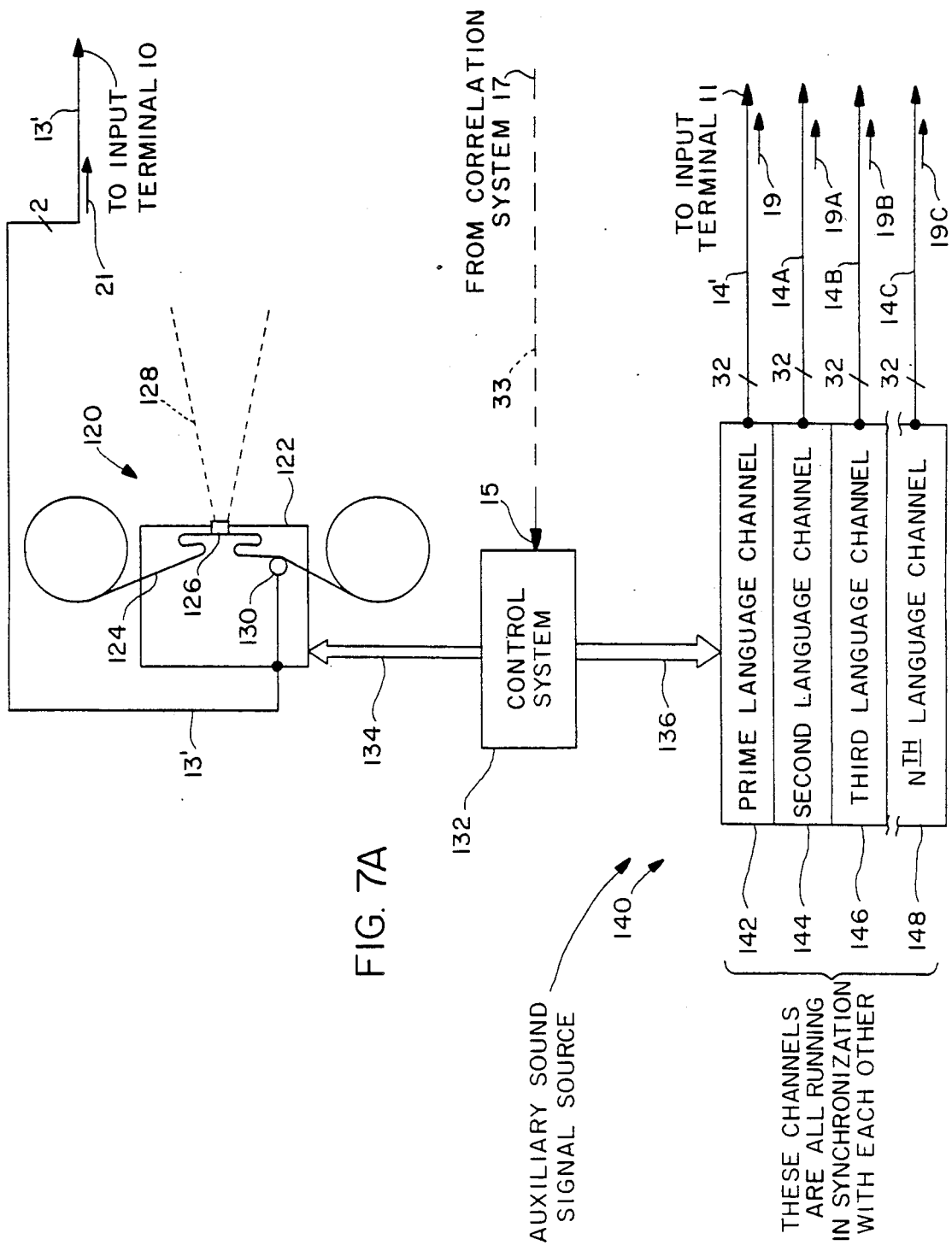

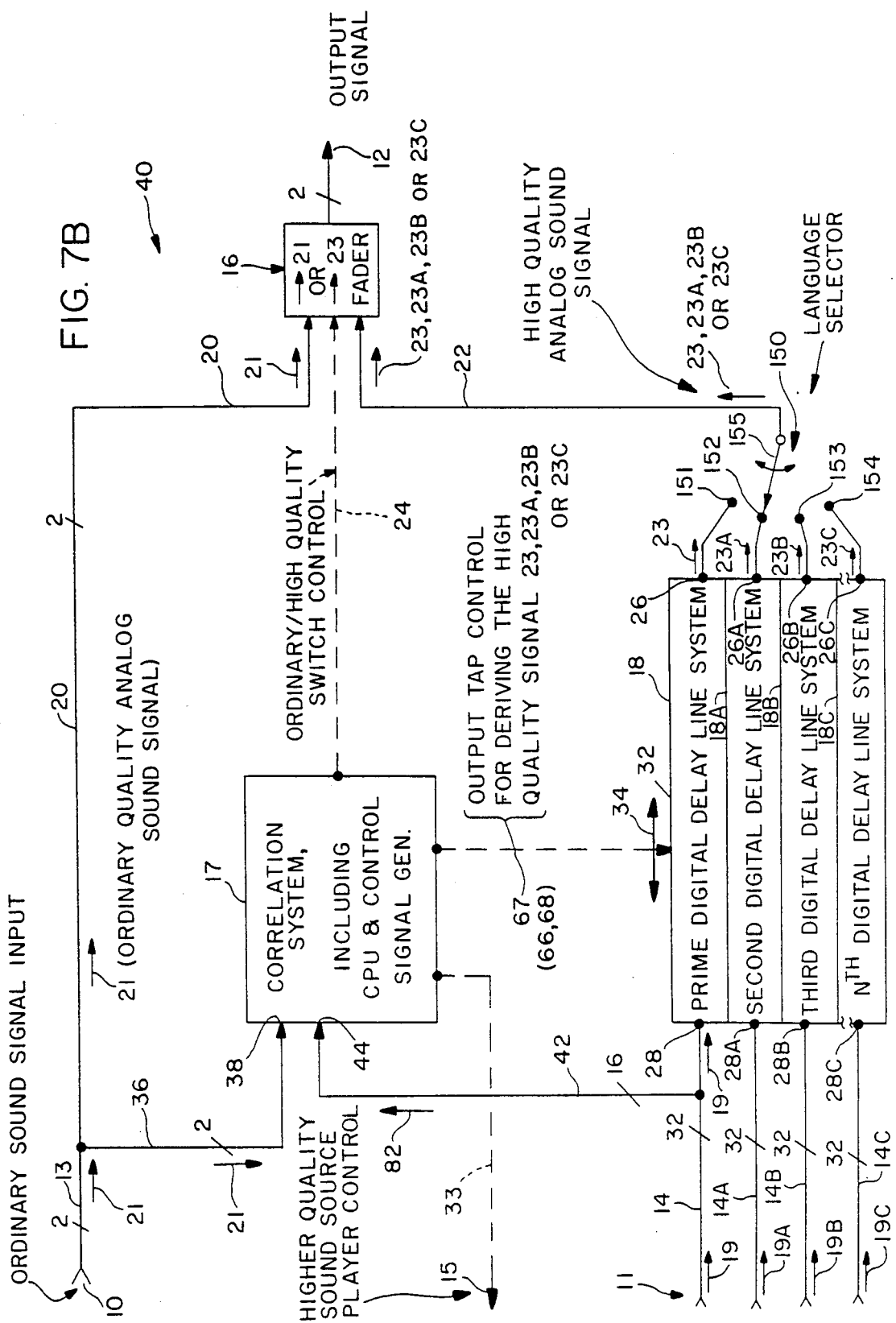

METHOD SYSTEM & APPARATUS FOR SYNCHRONIZING AN AUXILIARY SOUND SOURCE CONTAINING MULTIPLE LANGUAGE CHANNELS WITH MOTION PICTURE FILM VIDEO TAPE OR OTHER PICTURE SOURCE CONTAINING A SOUND TRACK

RELATED APPLICATION

The present application is a continuation-in-part of prior copending application, Ser. No. 132,295, filed Dec. 15, 1987 by the same two inventors now U.S. Pat. No. 4,839,733.

FIELD OF THE INVENTION

The present invention is in the field of sound synchronization, and more particularly this invention relates to a method and system for the synchronizing of a higher quality sound source with another sound source of the same information content. This method and system are typified by an auxiliary digital sound source being synchronized, i.e. locked in time, to an analog sound track of a cinema film as the motion picture is being shown, or are typified by such an auxiliary digital sound source being synchronized to a conventional audio portion of a video tape as the video tape program is being viewed.

The higher quality sound source contains a first (or "prime") sound track wherein the language spoken is identical (except for higher sound quality) to the language spoken in the ordinary quality sound track of the same information content in the other source. This prime track is used for synchronization with the other source. In addition, the higher quality sound source may contain one or more translation sound tracks, each of which is always simultaneously running in synchronism with the prime sound track. In each such translation sound track the spoken language is different from the language in the prime sound track and is different from the language in each of the other translation sound tracks. Each such translation track provides an appropriate translation of the prime spoken language. Thus by virtue of synchronizing the prime higher quality sound track with the ordinary sound track of the same informational content, each of the simultaneously running translation sound tracks is also inherently synchronized with the ordinary sound track. Therefore, advantageously, each of the translation sound tracks is available to be selected for listening by a cinema audience or by segments of the cinema audience sitting in preselected seating areas having listening devices assigned to respective languages (or selected by an individual viewer in a theater or at home desiring to hear a particular language furnished by a particular one of the available synchronized translation sound tracks).

BACKGROUND

At the present time, for the case of motion pictures, there are various techniques being used to permit the use of auxiliary (digital) audio sound sources for motion pictures. They require the preparation of a special film print which contains a unique marker code in place of the standard optical audio track. This special release print film, along with the digital audio recording and special playback equipment, is supplied to theaters for digital playback. Theaters with regular projectors must receive the standard film instead and cannot utilize the higher quality digital audio sound sources.

One reason why a unique marker code is required (rather than merely using the passage of time for synchronization) is that the motion picture film itself during its repeated handling and showing is subject to breakage and consequent film splicing. When the film is spliced, one or more frames of the film become lost at the splice depending upon whether the breakage was straight across the film or was a diagonal tear extending obliquely through more than one frame of the motion picture. This loss of one or more frames causes the motion picture and the sound track on the film to become shortened in physical length. Thus, there is a sudden forward "jump" in the motion picture which momentarily loses synchronism with the sound track when the splice passes through the motion picture projector aperture. The synchronism is regained when the splice passes through the sound transducer. This momentary loss of synchronism is due to the physical film path distance between the projector aperture and the sound transducer as is conventional in motion picture projectors. The sound track is conventionally offset along the length of the film from the specific frames to which the sound track relates by an "offset distance" equal to the length of the normal film path distance in a projector between the optical aperture and the sound track transducer. The method and system of the present invention do not remove that momentary loss of synchronism caused by the interaction of a film splice with the physical film path distance between the optical aperture and the sound transducer.

There are other reasons why a marker code is used on the motion picture film for synchronization of an auxiliary sound source with the film. These other reasons include start-up, unexpected stoppage due to variety of possible causes and speed creepage of either the motion picture projector or of the auxiliary sound source.

In the case of video tape, there are many synchronizing systems available which use special marker coding systems. However, there is no method available for use with home type video cassettes.

With the continual development of improved consumer audio media, such as the compact disc (CD) and digital audio tape (R-DAT), and the marketing of audio processing systems for use with VCRs, the home viewer is seeking betterquality sound, and the home viewer would like to enjoy this better quality sound with video viewing. This invention has direct application to this field of better quality sound to accompany video media.

In the case of editing video tape and film in post production, there are many synchronizing systems presently in use. However, there are numerous instances wherein a final or work print of a film or video production is made without synchronizing markers or codes. Additional editing, or remaking a better quality master, in which the various sources are synchronized to the work print, can be advantageously carried out by employing the invention.

A considerable expense is involved in producing a motion picture. When the picture is completed, its available audience is essentially limited to those who are fluent in the spoken language occurring in the original standard film track. A method and system which would enable appropriate spoken translations to be synchronized with the showing of the motion picture would considerably expand the available audience for a given film and would advantageously provide for international and cross cultural viewings of motion pictures.

SUMMARY

The method and system embodying the present invention keep an auxiliary sound source (generally the higher quality sound such as from a digital tape player) synchronized, i.e. locked in time, with the sound track on a motion picture film as the film is being projected, or with the video tape or program as it is being viewed. Thus the visual information is shown in conjunction with the auxiliary, generally higher quality, audio (which is in perfect synchronism with the picture).

The method and system of this invention are novel inasmuch as they do not utilize nor require synchronizing tracks, markers, codes, time codes, or other extrinsic (extra) data to be recorded on either the film or video tape, or the auxiliary sound medium, as do all previous methods. The invention utilizes the standard sound track as the source of synchronization.

For employing the invention it is a requirement that the high quality and ordinary quality sound recordings both contain the same audio message, i.e. that they both be made from the completely edited original source. For example, this completely edited original source is a "master recording" or is a high quality duplicate of the master recording. Then, the motion picture film's analog optical sound track or the video tape's audio track (or whatever ordinary sound track for accompanying a moving image) is made from this master recording. The high quality auxiliary sound medium is also made from the master recording, or from a high quality duplicate of the master recording, so that the ordinary sound track and the high quality auxiliary sound playback medium contain the same audio message. In other words, the present invention advantageously utilizes the intrinsic (inherent) information within the audio message itself to achieve synchronization of the high quality sound signal to the ordinary sound.

The invention herein advantageously utilizes the standard film which contains the optical sound track, or the video tape that contains the magnetic audio track, respectively. An auxiliary, higher quality recording of the same master is played back. The standard audio itself, from the film or video tape, provides the information that controls the timing of the higher quality auxiliary sound source. The auxiliary audio becomes locked to the film's or video tape's sound track and, therefore, is kept in essentially perfect synchronism with the picture.

This novel synchronizing method and system offer two major advantages over all other methods and systems, First, only a standard motion picture theater release print, or standard video tape, needs to be prepared and distributed for viewing. This single-inventory concept has obvious economic advantages over making a variety of release print types to bring digital audio to the movie audience. The same economic advantage applies to the video tape retail market. Secondly, the conventional sound track on the film or tape is redundant to the auxiliary, higher quality sound track and is always available to be used as the fall-back mode in case the higher quality, digital sound encounters difficulty.

The synchronization method and system of this invention handle diverse situations of start-up, stop, a film or tape splice, and speed creep in either the film, tape, or the auxiliary medium. The most difficult situation is that of the film or tape splice. Many frames may be missing due to the film breakage and repair. Also in the case of motion picture film, it passes through many hands wherein frames are sometimes removed by hobbyists collecting film segments. During film viewing, the motion picture image and the audio sequentially jump ahead at the splice. At a break or splice, the synchronization method and system of this invention immediately and automatically causes a cross fade of the auxiliary audio to the standard track on the film print or video track to continue the show. Also, there immediately occurs a shift into a "search mode" seeking to re-align synchronism of the auxiliary sound with the on-going standard sound. As soon as synchronism is achieved, there is another cross fade to return the audio playback to the auxiliary, higher quality sound track.

In summary, the synchronization method and system of the invention, upon a break or splice, enable automatic cross fades to the standard audio track on the film print or video for continuing the show. Concurrent with the preceding event, there is a shift into a search mode seeking to synchronize the auxiliary sound track to the on-going standard sound track of the picture. When the auxiliary audio and the picture conform again in synchronism, there is a reverse cross fade from the standard film or video sound track back to the higher quality auxiliary sound track.

Film creep relates to the normal or usual tendency for small differences to occur in reproduced speed between the playback of the standard sound and the running of the higher quality auxiliary sound source. The synchronization method and system of the invention prevent any such creeping differences in timing from occurring and also deal with the problem of controlling the operation of the player of the higher quality sound source.

In a further method and system embodying the present invention, the auxiliary sound source contains a plurality of sound tracks each containing a different spoken language. One of these sound tracks is the "prime track" wherein the language is identical (except for higher sound quality) with the language spoken in the ordinary quality sound track of the same information content in the other source. For example, the ordinary quality sound track is the standard English language track on a motion picture film or video tape. Thus, the prime sound track in the auxiliary source is the higher quality English language sound track of the same information content as on the motion picture film or video tape. It is this prime English language track which is employed for synchronizing the higher quality auxiliary sound source with the picture film or video tape. The translation sound tracks in this auxiliary source which contain the other spoken languages are all running in synchronism with the prime tracks, and thus they also are all running in synchronism with the standard English language track on the film or video tape being presented to the viewers. Consequently, these synchronously running translations are available to be selected for listening by various viewers.

BRIEF DESCRIPTION OF THE DRAWINGS

The various features, aspects, objects and advantages of the present invention will become more fully understood from the following detailed description and the accompanying drawings, in which like reference numbers refer to the same elements or components or signals throughout the various FIGURES, in which:

FIG. 4 is a schematic diagram of a fader included in the synchronization system of FIG. 1. This fader serves to switch the output signal smoothly between a higher quality auxiliary sound signal and an ordinary quality sound signal. The vast majority of the total time the higher quality sound signal is provided through the fader to the output. During those occasional instances when synchronism is momentarily lost due to splices involving missing segments of the moving picture source, as is explained later in detail, the fader automatically smoothly switches over to provide the ordinary quality sound signal to the output for maintaining continuity of the audio message, while synchronization is being regained for the higher quality sound signal, as explained later.

FIG. 5. is a plot illustrating switch-over characteristics of the fader of FIG. 4, showing how the higher quality sound signal voltage gain is smoothly decreased during a switch-over interval of time, while the lower quality sound signal voltage gain is smoothly increased, and vice versa during a reverse switch-over.

FIGS. 7A and 7B are to be viewed together as one drawing showing a functional block diagram of a method, apparatus and system embodying the present invention for synchronizing an auxiliary sound source to a motion picture film, video tape or other moving picture source containing a conventional sound track of ordinary quality. The auxiliary sound source contains a prime sound track wherein the spoken language matches the spoken language in the sound track of the motion picture source, except that the prime track is preferred to be of higher quality sound. In addition, the auxiliary sound source contains one or more translation sound tracks running in synchronism with the prime track and each containing a different spoken language. Thus, a particular spoken language can be selected to be heard by the viewer as may be desired.

DETAILED DESCRIPTION OF PRESENTLY PREFERRED EMBODIMENTS

The following detailed description makes use of block diagrams, and various components are explained in terms of their functional operation. It is to be understood that these components can be implemented in various ways, using either analog or digital techniques as will become understood by those skilled in the art in reading the following description with reference to the accompanying drawings.

Figure 1:
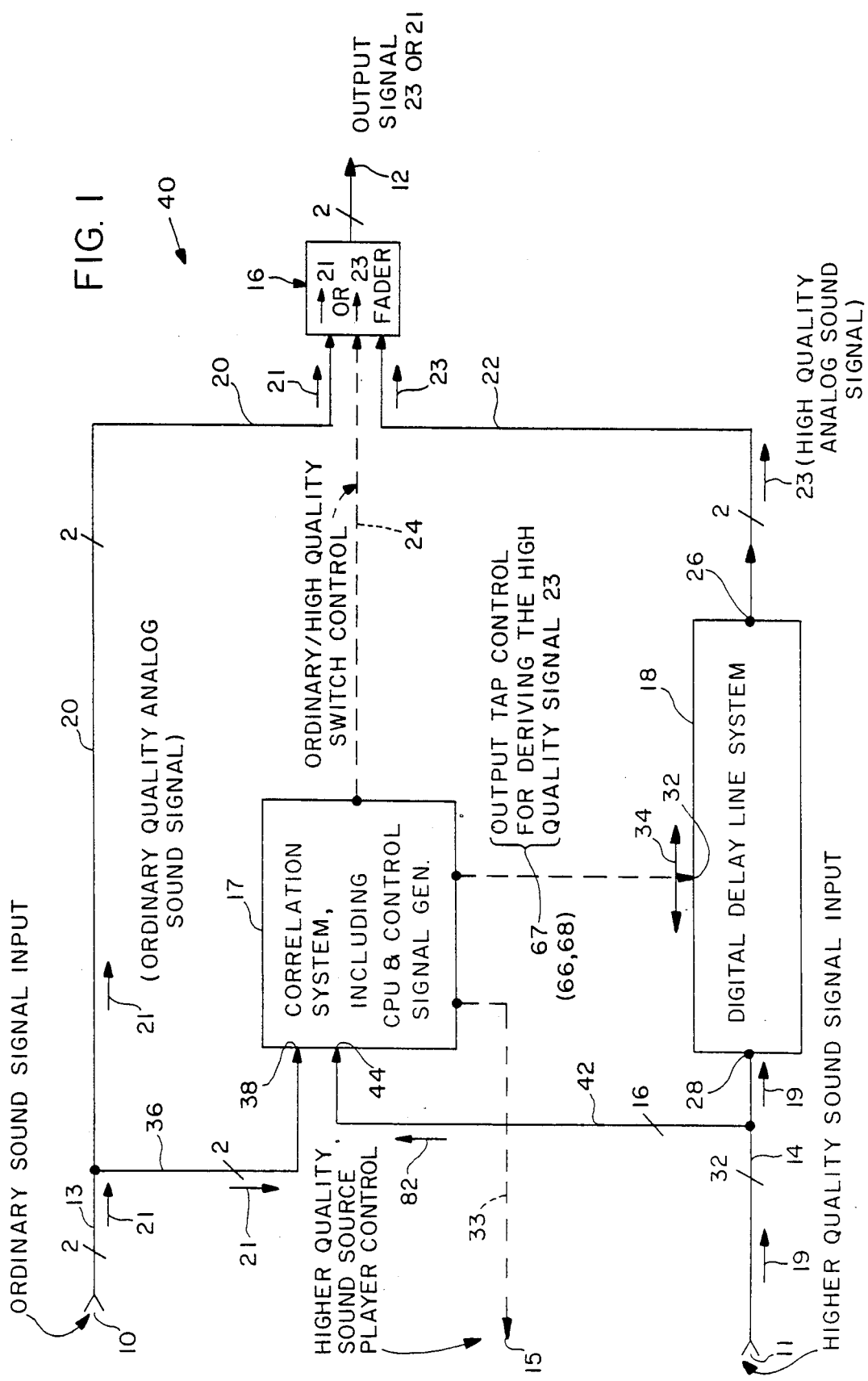
FIG. 1 is a functional block diagram of a method and system embodying the present invention for synchronizing an auxiliary sound source of higher quality to a motion picture film, video tape or other moving picture source containing a conventional sound track of ordinary quality.

Attention is invited to FIG. 1 which serves to explain the principles of operation and functional steps employed in one method and system embodying the present invention. There are two input ports or terminals 10 and 11. The first input port 10 receives a signal from the standard or ordinary sound track normally accompanying the visual media. In many cases this first input port 10 will be receiving an ordinary analog signal being transmitted over a two-line audio connection 13, for example this analog signal is originating from the sound track on a cinema film or from a sound track on the audio portion of a video tape. This analog input signal at the ordinary sound signal input port 10 comes from the film's stereo sound output and is the audio voltage that normally would go to the theater's sound system. The number 2 on this line 13 indicates a two-line or two channel connection.

Although the illustrative method and apparatus embodying the invention is shown handling a two-line or two-channel stereo input signal 21, it is to be understood that the invention is not limited to the handling of two-channel stereo. The method and system of this invention also can be applied to advantage for handling monaural sound signals and also for handling multi-channel "surround" stereo system sound, which may involve 4-channels or 6-channels, etc.

The second input port or terminal 11 serves to receive the higher quality sound signal, which corresponds with the ordinary sound signal. For example, this higher quality sound signal is a digital signal coming from an auxiliary digital sound storage system (not shown). As explained in the SUMMARY above, the one requirement for employing this invention is that this higher quality auxiliary sound source need have been made (recorded) from the original same sound master as the ordinary sound signal recording. This auxiliary higher quality sound signal source (not shown) does not form part of the present invention in regard to the disclosure in our patent application as filed on Dec. 15, 1987. (With regard to our continuation-in-part patent application wherein the auxiliary sound source includes translation sound tracks running synchronously with a prime sound track, in the same language as the ordinary sound signal recording, we believe that the auxiliary sound signal source is patently novel.) The auxiliary storage system may be any one of many high quality sound playback systems, such as a compact disc (CD), rotary digital audio tape (R-DAT), video cassette adapter system (Sony model F-1 or PCM-1630 series), or one of the digital audio stationary head machines (DASH). The input line 14 from the higher quality input port 11 is indicated by the number 32 to be a thirty-two line digital audio signal transmission buss representing, say, two channels of 16 bit parallel audio lines.

The method and system shown in FIG. 1 has a single audio signal output port or terminal 12, for example a two-line stereo audio output terminal. This output terminal 12 provides the audio voltage that drives the theater's sound system. The intent is that this audio output voltage at terminal 12 will come from the higher quality digital sound signal input, whenever digital program material is present, or whenever a transition is not occurring. If there is no higher quality sound signal source, then the output at terminal 12 will contain the conventional ordinary sound signal being received at the input port 10.

There is also a control terminal 15 which serves to control both the rate of the higher quality audio digital information being received at the second input terminal 11 and also controls the speed of the playback mechanism of the high quality sound source.

FIG. 1 shows three major functional blocks: a fader 16, a correlation system 17, and a delay line system 18. Although each functional block 16, 17 and 18 will be discussed in detail in later sections, it is helpful to the reader to provide first an overview of their respective functions.

PRELIMINARY DESCRIPTION OF THE FADER

The fader 16 switches between the conventional or ordinary audio signal supplied via a connection 20 and the higher quality sound signal on a connection 22 from the delay system 18. This fader is controlled by proper commands from the correlation system 17, and these command signals are provided to the fader 16 from the correlation system 17 as indicated by the dashed line (control function path) 24.

However, this fader 16 is not an ordinary switch; it is a cross fade device, which is similar in concept to a "dissolve" for slide projectors. If the command is given to switch from, say, ordinary input on line 20 to higher quality input on line 22 then the ordinary sound signal would be attenuated over time to reach full off, and the higher quality sound signal would be augmented from off to full on, over the same time period, This type of fader "switch" produces a benign transient which, for most program material, is inaudible to the audience. In this case, all that would be noticed over time is an improved audio characteristic, due to the higher quality digital playback audio signal on line 22. There is no annoying "pop" due to the switchover.

For providing a practical illustrative example of an application in which the method and system of this invention can be employed to good advantage, this description will now focus upon synchronizing a higher quality auxiliary digital sound signal 19 with an ordinary analog sound signal 21 coming from a cinema film, as the motion picture is being shown in a theater.

PRELIMINARY DESCRIPTION OF THE DELAY LINE

The delay line system 18 may have any desired practical delay. In this example, the digital delay line system 18 handles the sound for up to ten seconds of missing motion picture film frames, and thus it has a ten-second delay capability. In addition, this delay line system 18 must have the same digital word width and the same average sample rate as the digital audio signal 19 which is fed into the input port 11. In this example the high quality sound signal 19 on the thirty-two line buss 14 is characterized by two channels of sixteen-bit words having a sample rate of 48 kiloHertz each.

It is to be noted that this delay-line system 18 determines the maximum range of time synchronization capability, e.g. up to 10 seconds of missing film frames. It is desired that the fidelity or quality of the high quality analog sound signal 23 at the output of 26 be equal to the fidelity or quality of the entering high quality sound signal 19 for providing the full advantages of the present invention. In order to achieve the preservation of quality, it is necessary that the delay-line system 18 have the same (or greater) number of bits per sample as the entering digital sound signal 19. (It is also possible for the delay-line system to have a faster sample rate than the entering digital sound signal 19, providing an appropriate sample rate converter be utilized in conjunction with the input port 28.)

The delay line system 18 is intended to store as long a time-segment of the digital audio signal 19 as permitted by its capacity, e.g. a ten second time-segment. The output end 26 of this delay line system is generally running in exact synchronism with the ordinary audio signal 21. (However, whenever a film splice due to missing film frames has just been encountered; then, the output end 26 will momentarily be running behind exact time synchronization with the ordinary sound signal 21; the fader 16 will be switched over for transmitting the ordinary signal 21 to its output 12; and the delay line system 18 will be operating in a synch-search mode to be explained later.)

It is to be noted that the delay line system output end 26 includes a digital-to-analog converter (DAC) 30 (FIG. 2) for converting the digital signal 19, which has been stored in the delay line into a high quality analog audio signal 23, being fed over a two-line connection 22 to the fader 16.

It is to be understood that this delay line system 18 is filled with digital signals for high quality sound which is LATER IN TIME (emphasis intended) e.g. up to ten seconds later in time, than the instantaneous present time of the ordinary sound signal 21. Whenever a film splice (missing frames) is encountered, then the correlation system 17 advantageously instructs that the high quality analog audio output signal 23 supplied from the output 26 of the delay system be derived from stored digital signals at a later time (towards the input end 28 of this delay line.)

In an advantageous effect on the output the derivation tap 32 is moved ahead (later) in time by being shifted toward the delay line input end 28. In other words, the high quality analog signal 23 must be caused to "jump ahead" in order to regain synchronism with the film sound track signal 21 which has already experienced a jump ahead due to missing film frames. The left/right arrow 34 indicates that the correlation system 17 provides the output tap control 32 for determining the location within the delay line system 18 of the digital signals from which the high quality analog signal 23 is derived.

The input end 28 of the delay line system 18 receives its input signals 19 from the auxiliary digital sound source medium. The momentary rate that the digital samples are received is controlled by the auxiliary digital sound source player control 15. For the missing frame situation described above, the momentary rate of the digital samples is now increased. Since the sample rate of the signals 19 is now momentarily faster than normal, the delay output tap control 32 is caused to move slowly from the jump-ahead position back to the output end 26 of the delay line 18, in order to be available to react for any subsequent missing frames. The digital sound storage medium is then returned to it's nominal rate by the player control 15, when the delay output tap control 32 has again reached the output end of the delay line 18.

When the delay output tap control 32 is at the output end 26 of the delay line system 18, then this illustrative system as described has its normal capacity to maintain almost uninterrupted availability of synchronized high quality analog sound signals 23 up to a ten-second time-segment of missing film frames.

In the event that a 6-second time-segment of missing frames has just been encountered, then the delay tap 32 will quickly be shifted to a point as shown in FIG. 1 which corresponds with 6 seconds from the output end 26 and 4 seconds from the input end 28. In this particular situation, as shown in FIG. 1, the system still retains the capability to maintain almost uninterrupted availability of synchronized high quality analog sound signals 23 up to the occurrence of a 4-second time-segment of missing frames close in time with the 6-second film splice "break" which has just been encountered.

In the event that a film splice "break" longer than 4 seconds is encountered close in time, after the occurrence of a 6-second film splice "break" represented by the showing in FIG. 1, for example assume that a 7-second film splice "break" is now encountered, then the delay control tap 32 is shifted to a position at the very front end 28 of the delay line system 18. When the initial 6-second film splice "break" was encountered, it caused the digital player via line 15 to begin running at a faster rate than normal in order to reset itself to the normal 10-second digital storage. The digital player continues to run at this faster than normal rate when the 7-second "break" is encountered. The sum of a 6-second and then a 7-second film splice "break" is 13 seconds, which is recognized to exceed by, 3 seconds, the 10-second delay storage capability of this particular system 18, i.e. there is a 3-second time segment "gap." Consequently, the availability of synchronized high analog sound signals 23 is "lost" for a short while until this 3-second "gap" can be closed. The theater audience now hears the ordinary analog signal 21 while the "gap" is being closed. The digital player is continuing to run faster than normal, and soon the digital signals 19 arriving at the front end 28 correspond in time with the ordinary signals 21. The 3-second "gap" has now been closed, and the delay tap control 32 causes these appropriately synchronized high quality analog sound signals 23 to appear at the output 28 of the delay line system 18. The fader 16 now shifts over to the high quality sound signals 23. The digital player continues to run faster than normal, while the delay tap control 32 is caused progressively to move (arrow 34) along the delay line system 18 towards the output end 26. When this delay control tap 32 reaches the output end 26, then once again this output end 26 is exactly synchronized in time with the occurrence of the on-going ordinary sound signals 21.

Small corrections in speed are made either by causing the digital player control 15 to slightly adjust the average playback speed of the digital medium or by moving the position (arrow 34) of the delay tap control 32 along the delay line system 18, or a combination of both small corrections can be used. The important point to be understood is that small corrections in timing can be made on an almost continuous basis to keep the digital signal in exact synchronization.

As mentioned previously, it is to be noted that the number of communication "lines" for each connection (for each buss or communication pathway) is indicated by a numbered slash on the connection. It is to be understood that each communication line has an associated return (or ground) conductor in order to complete the circuit for the communication line. In some instances there is a common return (or common ground) for a plurality of communication lines. For example, in FIG. 1 the output pathway 12 for the signal voltage being fed to the stereo loudspeaker system of the theater has a "2" numbered slash, thereby indicating two communication lines, namely one line for the left side stereo loudspeakers and a second line for the right side stereo loudspeakers. As understood by those skilled in the art, there is also a return conductor (not shown) for each of these two output signal lines, and that return conductor may comprise a common return at ground potential for both lines.

The whole synchronization system shown in FIG. 1 is generally indicated by the reference number 40.

PRELIMINARY DESCRIPTION OF THE CORRELATION SYSTEM

Inviting attention to the correlation system 17, it is to be understood that this system 17 provides two functions: (a) analysis and comparison of the ordinary quality analog sound signals 21, which are fed in over a two-line path 36 to an input port 38, to high quality digital sound signals 19, which are fed in on a 16-line path 42 to input terminal 44 of the correlation system 17, and (b) controlling the whole synchronization system 40. The reason for a two-line path 36 is to handle both the left analog stereo signal and the right analog stereo signal.

In the analysis and comparison function, the correlation system 17 is analyzing the envelope of the ordinary quality analog sound signals 21 and is comparing the results of this analysis with the envelope of digital audio signals which are fed over a sixteen-line input buss 42 to a high quality digital sound signal input terminal 44 of the correlation system 17. The reason for using the sixteen-line input buss 42 is to accommodate both left and right digital audio signals as 8-bit parallel words. It is seen in FIG. 1 that the higher quality digital audio signal on input buss 14 comprises 16-bit words for both left and right stereo digital audio, thus requiring a 32-line buss 14. In this present embodiment of the invention the least significant eight bits of both the left and right stereo audio words are not communicated via the sixteen-line input buss, because the correlation system 17 operates with regard to average envelope information and does not require greater precision than provided by the sixteen-line buss 42, as will be explained later. From the comparison of the inputs at terminals 38 and 44, the correlation system 17 determines at each instant the appropriate delay tap 32 of the delay line 18 from which to feed the output 26.

As part of its overall control functions (b) mentioned above, the correlation system 17 determines the appropriate command signals fed to the output 15 for instructing operation of the digital playback medium and also determines the appropriate command signals fed via control path 24 for instructing operation of the fader 16.

This correlation system 17 includes microcomputing elements and performs various internal functions in accordance with algorithms to be explained later.

In this practical implementation of the synchronizer system 40, the correlation system 17 also contains the instructions and sub-routines for starting the film and controlling the higher quality auxiliary digital audio, including starting, stopping, and perhaps rewinding the digital audio medium, and all other control matters pertaining to the system automation. For example, the synchronizing system 40 employs a delay line 18 of, say 10 seconds. Consequently, the digital audio medium will have to start running ten seconds in advance of the cinema film in order to fill the digital delay line 18 before the film starts showing (before the ordinary analog signals 21 start arriving at the input 10). This ten second "head start" for the digital player will thereby fill the ten-second delay line so that the first digital signal output at 26 will exactly correspond with the first ordinary analog signal arriving on the input connector 13. Instead of a ten-second head start, the digital player and the delay line 18 may be arranged to make a "fast dump" of the data corresponding to ten-seconds worth of higher quality sound signal 19. Such a "fast dump" may occur in much less than ten seconds.

DIGITAL DELAY LINE SYSTEM 18

Figure 2:
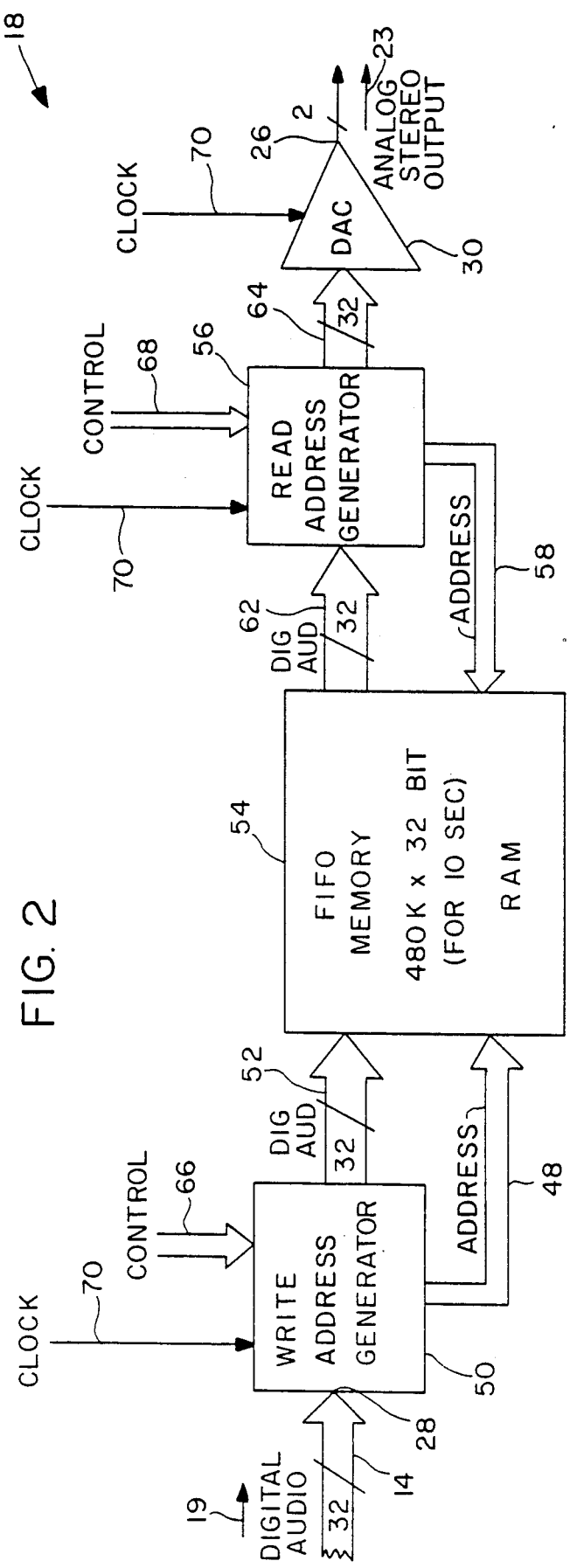
FIG. 2 is a schematic diagram of a digital delay line system incorporated in the synchronization system of FIG. 1.

FIG. 2 shows a functional block diagram of a presently preferred digital delay line system, commonly called a FIFO, or first-in first-out overwriting memory store. This digital delay line system 18 operates as follows: the higher quality digital audio signal data 19 is presented via the 32-line input buss 14 to the input 28 of a write address generator 50.

An address (memory location) 48 is assigned and, as indicated by the arrow 52, the digital audio information is stored there in a random access memory (RAM) 54. The digital information is written into the memory 54 sequentially until all the memory is filled. Then, the process is repeated by replacing the previous data with the new information in the same sequence. The memory 54 must be sufficient to store the required number of data samples to make up the desired delay time of ten seconds. For example, to accommodate ten seconds of left stereo sixteen-bit words and right stereo sixteen-bit words at a sample rate of 48 kHz the memory capacity is at least 480 k times 32 bits, as indicated.

The output at 26 from the whole delay line system 18 comes via a read address generator 56. For a maximum delay of, say, ten seconds, the chosen address indicated by the function arrow 58 is that of the digital audio data (digital audio word) which has been resident in the memory 54 for the maximum available ten seconds, i.e. the longest-resident digital audio word in memory. This longest-resident digital audio word is the first-assigned digital audio word of all words currently in memory. This maximum-delay word is then presented, as indicated by the function arrows 62 and 64, to the digital-to-analog converter (DAC) 30 and appears at the output 26.

This maximum delay situation as just described means that the output data stream 62, 64 is exactly the same as the input data stream 52, except that a ten-second time difference exists. Turning attention back to FIG. 1, this maximum delay situation is indicated when the delay output tap 32 is located at the very output end of the delay line system 18.

It is noted that the delay time may quickly and appropriately be reduced from maximum by the advantageous expedient of assigning a new address 58 (FIG. 2) to the read address generator 56 from which the sequential process continues. For example, assigning an address 58 halfway through the memory 54 instantly advances the high quality audio signal 23 in time by fifty percent of the delay line's length, namely, by five seconds in this delay line system 18. This process of assigning a new address 58 from which to chose the next word in such a FIFO overwriting store is sometimes called "changing the read pointer position".

FIGS. 1 and 2 both show the digital audio input buss 14 as having 32-lines. These 32-lines provide for a parallel feed of two 16-bit wide pulse code modulated (PCM) words for left and right stereo digital audio as occurs in currently commercially available high quality digital sound systems. The digital output 62, 64 is similarly on 32-lines, and this digital output feeds the DAC 30 which provides the high quality analog stereo sound signal 23 for driving the theater's sound system.

As shown in FIG. 2, there are two control busses 66 and 68 coming from the correlation system 17 (FIG. 1). For clarity of illustration in FIG. 1 and for clear explanation, these control busses 66 and 68 are considered to be included within the control pathway 67 shown in FIG. 1 extending from the correlation system 17 to the delay output tap 32, 34. It is to be understood that each of these control busses 66 and 68 contains multiple communication lines. The first control buss 66 serves to control the write address generator 50, and the second control buss 68 controls the read address generator 56 and serves to determine the read address location 58, i.e. "determines the read pointer's position."

There is a master clock 69 (FIG. 6) for controlling the timing of the digital processes throughout the synchronization system 40. As indicated by the arrows 70, clock pulses are fed to the write address generator 50, to the read address generator 56, and to the DAC 30.

CORRELATION SYSTEM 17

As discussed above in the preliminary description of the correlation system 17 (FIG. 3) and its operation, this correlation system serves as the controller for the synchronization system 40 (FIG. 1 or 6) as a whole. This correlation system 17 includes signal processors, digital storage capability, correlation circuits, control circuits and a central processing unit (CPU) 31 which controls and keeps track of all activities within the synchronization system 40.

In the activity of correlation, the system 17 is continuously assuring that the higher quality digital audio being supplied to the DAC 30 (FIG. 2) at the output end 26 of the delay line system 18 is the same, but higher quality, sound as the conventional analog audio signals 21 (FIGS. 1 and 3) coming from the film being shown. If the film audio signal 21 becomes different from the digital audio signal about to arrive at the DAC 30, then the correlation system 17 causes the overall synchronization system 40 to make an appropriate response, as explained in detail later.

It is to be understood that as used in this specification the term "correlation" is intended to have a precise engineering or mathematical meaning. As used herein "correlation" means to compare and calculate unambiguously that the ordinary sound signal 21 (FIG. 1 or 3) which is now being received at the input connection 13 and the higher quality sound signal being delivered from the output end of the digital delay line system 18 carry the same audio message.

Since the ordinary sound signal 21 is being derived from the portion of the motion picture currently being shown, this ordinary signal always contains the appropriate audio message to accompany the current picture. When missing picture frames are encountered due to a film splice, the motion picture suddenly apparently "jumps ahead" in time, and the ordinary quality audio message 21 makes a similar corresponding jump ahead in time. When a difference in the two audio messages is sensed by the correlation system 17, a "synch search" mode immediately is initiated, and the fader 16 is caused to switch over to convey the ordinary quality sound signal 21 to the theater sound system. The correlator 17 immediately begins to determine the new address to place the read pointer 58 (FIG. 2), which is later in time or closer to the input end 28 (FIG. 1). As soon as the new address 58 for the same audio message has been found, synchronization has been re-established, and the stored digital audio from this new address immediately is sent through the DAC 30 to the output 26. The fader 16 (FIG. 1) is immediately switched back to convey the appropriate, re-synchronized high quality audio signal 23 to the theater sound system.

It is to be noted that this correlation process is re-iterative. That is, the envelopes of two audio signals are being compared by repeatedly rapidly comparing in sequence the magnitudes of the voltages of the envelope of the high quality digital audio at a plurality of addresses in a memory store with the present magnitude of the voltage of the on-going ordinary quality audio. In effect, the correlation process is looking for (is seeking) that particular sequence of addresses on a memory store where the magnitudes of the voltages of the envelope of the high quality digital audio over a brief time interval match with (track along with) the magnitudes of the voltages of the envelope of the on-going ordinary audio over the same brief time interval. In other words, a sequence of numbers representing magnitudes of the voltages of the high quality audio envelope are correlated with, i.e. are matched over a brief time interval with (and are found to track along with), a sequence of numbers representing magnitudes of the voltages of the on-going ordinary quality audio envelope occurring over this same brief time interval.

In the present embodiment of this invention, this correlation is advantageously achieved by re-iterative subtraction. Various sequences of numbers for the envelope of the high quality sound and the current (at the present time) sequences of numbers for the envelope of the on-going ordinary sound are repeatedly subtracted from each other to provide difference values "D" in FIG. 3. Difference values "D" which are near zero and which remain near zero over an interval of time at a particular sequence of memory store addresses, i.e. at a particular read pointer position, are said to be yielding a high correlation, i.e. to be indicating that this particular read pointer position is the appropriate position for synchronization.

When the re-iterative correlation is "high," then the correlation system 17 accepts the read pointer position. If the correlation is poor, i.e. the difference values "D" are not near zero, then the comparison is repeated, until a new pointer position is found where the correlation again becomes high and remains high over a brief interval of time.

Also, during the time while no pointer position is found where the correlation is high, then the fader 16 is caused to remain changed over to the conventional analog signal 21 so that this conventional signal 21 is supplied at the output 12 to the theater's loudspeaker system. When a new pointer position is found where the correlation is high, the corresponding high quality digital audio signal from this new pointer position immediately goes to the memory store output 26 (FIG. 2), and the fader 16 is rapidly switched to feed this resulting new high quality audio signal 23 to the output 12.

Figure 3:
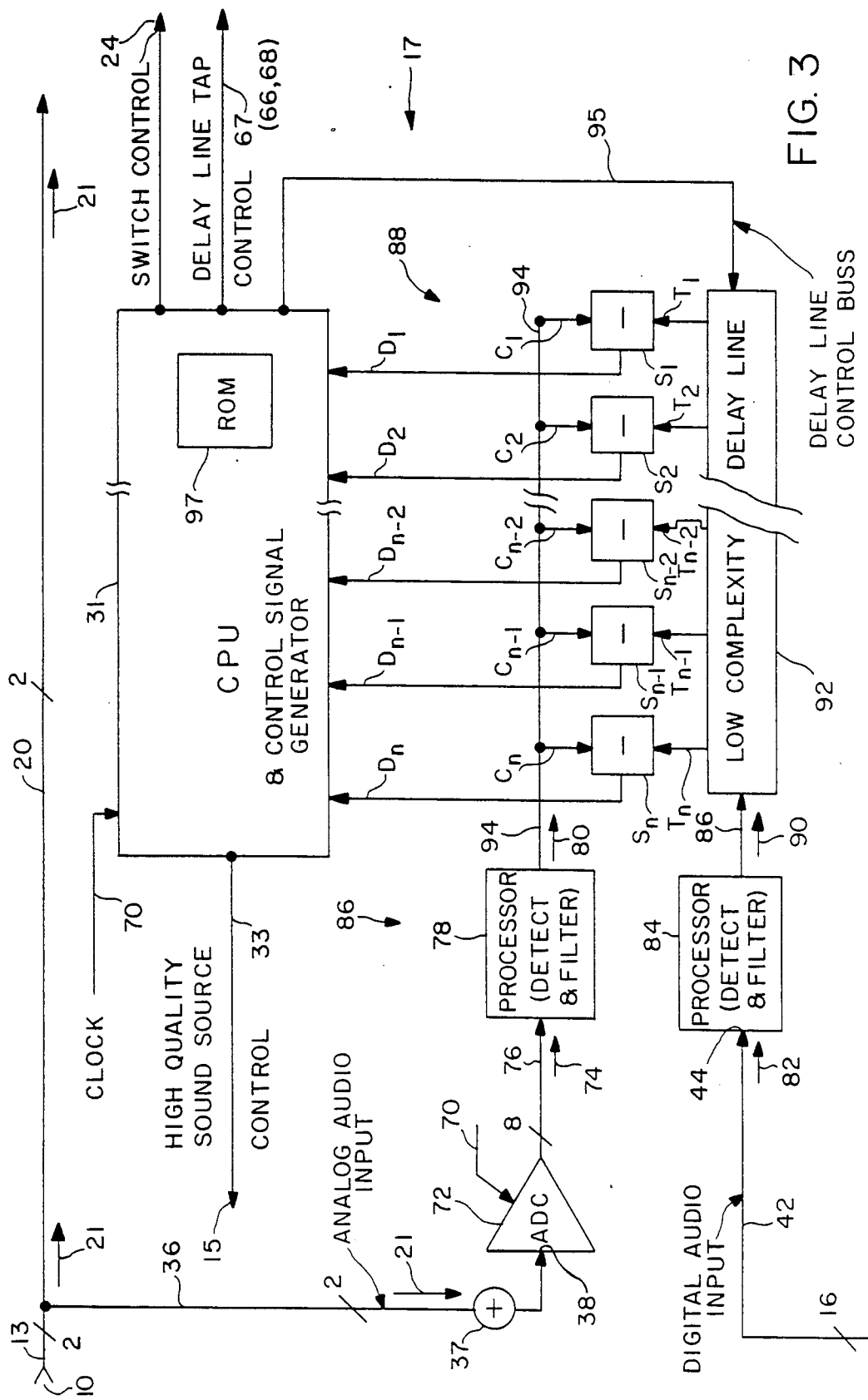
FIG. 3 is a schematic diagram of a correlation system included in the synchronization system of FIG. 1.

FIG. 3 shows a functional block diagram of the correlation system 17 for making the re-iterative subtractive comparison as described above. The stereo analog audio signal 21 approaching the input terminal 38 has its left (L) and its right (R) stereo signals added together in adder 37, and the resulting monaural analog signal enters the input 38 of an ADC (analog-to-digital converter) 72 in which this monaural analog signal is converted to an 8-bit monaural digital representation 74. It is this monaural signal which is converted into the 8-bit digital representation 74. This digital representation 74 is fed by an 8-line connection 76 into a processor 78 which obtains the absolute instantaneous values of the digital representation 74 by an absolute value algorithm which causes all negative numbers to become positive and then band limiting the result by a low pass digital filter algorithm which provides new digital numbers representing the "absolute value envelope" (no negative numbers) confined to less than a predetermined frequency. For example, in the present embodiment of the invention this predetermined frequency limit for the low-pass digital filter algorithm is 50 Hz.

The reason for using a low-pass upper limit of less than about 50 Hz is that such a frequency is sufficiently high to characterize with suitable definition the "syllabic structure" of intelligible audio messages and is low enough to avoid imposing unduly or unnecessarily high rate requirements on the correlation system 17.

The result of this processing in the processor 78 is to provide a digital signal 80 on a buss 94 containing a sequence of digital numbers representing the absolute value envelope confined to less than 50 Hz of the monaural combination of the L and R analog audio signal 21. Therefore, this representative digital signal 80 advantageously gives a useful representation of the audio magnitude distribution occurring within the "syllabic structure" of the on-going ordinary quality audio message 21. In other words, this envelope representation signal 80 contains very useful information about the on-going sequence of syllables (on-going significant events) which characterize the ordinary quality audio message 21, but this envelope representation signal 80 does not contain enough digital data to define the precise waveform of the ordinary quality analog stereo signal 21. By virtue of using this syllable-type absolute value envelope representing signal 80, the rate requirements of the correlation system 17 are correspondingly lower as compared with using more precise representation of the original analog stereo signal 21.

The digital signal 82 supplied over the 16-line buss 42 comprises two 8-bit words for the respective left and right stereo digital audio. The eight least significant bits of the L and R stereo digital words in the high quality signal 19 on the 32-line input buss 14 are omitted from the 16-line buss 42, as discussed further above. This digital signal 82 is supplied to a processor 84 which operates in a manner similar to the processor 78 plus the adder 37 and ADC 72 described above. Thus, the processor 84 combines the L and R 8-bit stereo words 82 into an 8-bit monaural word and then uses an absolute value algorithm and a low-pass digital filter algorithm confined to the same frequency limit being used by the processor 78, namely 50 Hz, for producing a digital signal 90 on a buss 86. This digital signal 90 contains a sequence of numbers representing the absolute value envelope confined to less than 50 Hz of the combination of the L and R digital audio signal 82. Therefore, this representative digital signal 90 gives a useful representation of the audio magnitude distribution occurring within the "syllabic structure" of the high quality digital audio message 19 (FIG. 1). This envelope representation signal 90 contains very useful information about the sequence of syllables (sequence of significant events occurring with passage of time) which characterize the high quality digital audio message 19, but this envelope representation signal 90 contains considerably less than enough digital data to define the precise analog waveform which is delineated by the high quality stereo signal 19.

In the functional block diagram in FIG. 3, the envelope representation signal 90 is being shown supplied by a connection 86 to a low complexity delay line 92 having the same time-delay length, for example ten seconds, as the high quality digital delay line system 18 (FIGS. 1 and 2). The envelope signal 90 (for the digital audio message 19) precedes the other envelope signal 80 (for the analog audio message 21) by the time-delay of the delay lines 92 and 18, say ten seconds, because the high quality auxiliary digital sound medium was started running ten seconds before the cinema film was started running. This ten-second "head start" of the digital audio message thus causes the envelope signal 90 to precede the envelope signal 80 by ten seconds in this embodiment of the invention. Consequently the delay line 92 has been supplied with and has become filled with the most recent ten seconds of the envelope representation signal 90.

It is to be understood that a delay of less than ten seconds, for example eight seconds or six seconds can also be used to good effect, if desired. The acceptable compromise of using a shorter delay time than the presently preferred pre-determined delay in the range of about 8 seconds to 10 seconds merely causes lessened capability to maintain uninterrupted synchronization of the higher quality sound when showing spliced motion picture film wherein the splices involve significant time-segments of missing frames. Due to an acceptable compromise of using a shorter delay time storage capability than about 8 seconds, the fader 16 will switch over somewhat more often to the conventional signal 21 and some such switchovers will have a longer time duration than would occur with a longer delay time capability when showing any given motion picture film with a significant number of splices. At the present time we believe that a delay time storage capability of about three seconds is the practical lower limit for suitable, good effect operation with the standard used release print containing significant numbers of significantly long missing time-segment splices.

Inviting attention again to FIG. 3, (and as explained above) the envelope signal 90 is earlier in time than the signal 80 by the pre-determined delay-time capability of the low complexity delay line 92 which exactly equals the predetermined delay-time capability of the high quality digital delay line system 18. This low complexity delay line 92 is shown as having numerous output taps T1 through Tn located at spaced equal time-delay increments. For example, these time-delay intervals "T" are spaced uniformly 100 milliseconds apart.

Figure 3A:
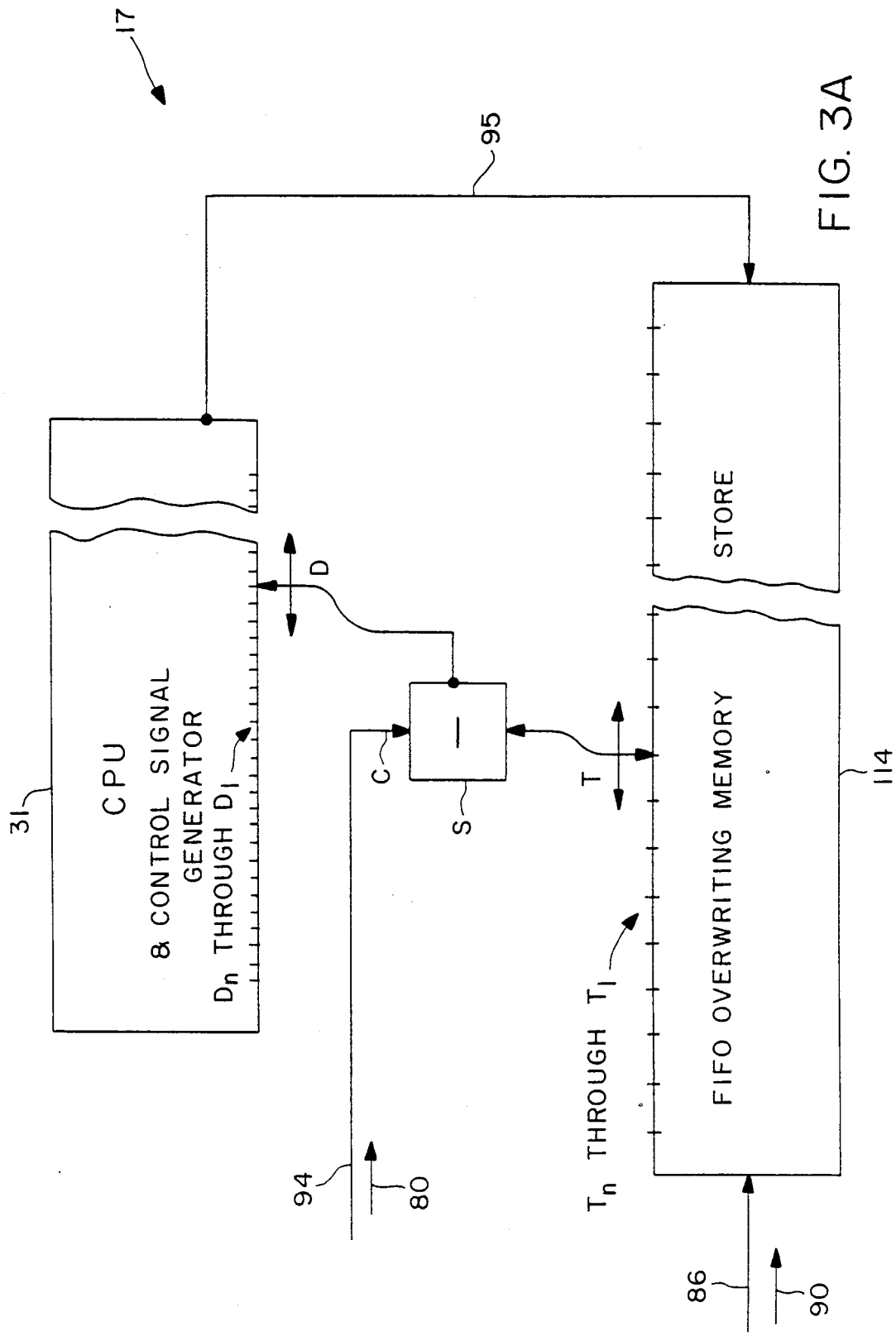
FIG. 3A is a functional block diagram of a presently preferred system for accomplishing the correlation and comparison functions of FIG. 3.

It is helpful in explaining and in understanding this embodiment of the invention to think initially in terms of taps "T" spaced along a delay line 92 by uniform increments of time, e.g. 100 milliseconds. Further description below in conjunction with FIG. 3A showing a FIFO overwriting memory store 114 will complete the full explanation and understanding of this correlation system 17 (FIG. 3).

Sequential re-iterative comparisons C1 through Cn are being made between the on-going digital numbers 80 on the buss 94 with the stored digital numbers 90 at the respective time points T1 through Tn in the delay line 92. These comparisons are advantageously being made by sequential subtractions S1 through Sn, and the resulting sequential numerical differences D1 through Dn are fed into the CPU of the functional block 31. The particular re-iterated subtractions S whose difference D currently (now) has a numerical value approaching zero and remaining near zero over a brief interval of time is that subtraction whose input tap T has present numbers equal to the present instantaneous numbers of the envelope representation 80 on the comparison buss 94. It is this particular D presently having a near zero value which serves as the "marker" for the CPU 31 for selecting the appropriate delay time to use for moving the output tap 32 (FIG. 1) to the appropriate delay time location in the digital delay line system 18.

The foregoing explanation in terms of a moving tap is for aiding in understanding the present embodiment of the invention. With attention invited to FIG. 2 and FIG. 3 it will be seen that it is the particular re-iterated subtraction S whose difference D currently has a near zero value and which remains near zero over a brief time interval which serves as the "marker" for causing the CPU 31 acting through the control buss 68 to instruct the read address generator 56 to address 58 the new appropriate memory location in the memory unit 54. Starting at this new address the read signal generator 56 now causes the read pointer position 58 to scan through the sequential locations in the memory store 54 for bringing the appropriate sequence of digital words to the DAC 30 for producing the appropriate high quality analog stereo voltage output signal 23 synchronized with the ordinary quality signal 21.

It is presently preferred that a FIFO overwriting memory store 114 (FIG. 3A), similar to that shown in FIG. 2, be used to serve as this low complexity delay line 92 (FIG. 3). Then, a microprocessor, CPU, using a time-share program, serves to perform the numerous subtractions S1 . . . Sn and acts through a control buss 95 in conjunction with the FIFO overwriting memory store system 114.

For example, in this correlation system 17 the CPU is performing subtractions S (FIG. 3A) at the rate of 1,500 samples per second. A subtraction S (FIG. 3A) is performed, and the resultant difference goes into a particular memory store location D1 through Dn in the CPU. Then the next subtraction is performed using the number now stored at an address in the FIFO memory which is spaced 100 milliseconds from the address for the preceding subtracted number, and the resultant difference goes into a next particular memory store location D1 through Dn in the CPU. This sequential subtraction is continued until all of the difference memory store locations D1 through Dn have each received respective difference numbers and then the subtraction process continues repeating over and over at the sample rate of 1,500 per second. The memory store locations D1 through Dn in the CPU are each cumulative, and they each have the same discharge or drain-down rate. Thus, the particular memory store location D1 through Dn, which currently is storing a cumulative difference nearest to zero and whose stored cumulative difference remains nearest to zero, is the "marker" as described above for selecting the appropriate read address 58 (FIG. 2) for synchronization.

In this example, where the subtraction sample rate is 1,500 per second, where the delay time storage of the FIFO memory store 54 in FIG. 2 and also that of the store 114 in FIG. 3A is 10 seconds, and where the sampled addresses are spaced apart 100 milliseconds (0.1 second), then there are 100 addresses (which means n equals 100) being sampled, and so the repetition rate for sampling each particular address in 15 times per second.

There is a realistic basis for these values being used in this embodiment. Sound travels at about 1,100 feet per second through air at sea level. In a theater where some of the audience is about 110 feet away from the screen, the audience in the rear of the theater is not concerned that the audio message as actually heard is 1/10th of a second behind the action being seen on the screen. Thus, a 100 millisecond (1/10th sec.) spacing of the sampled addresses is sufficiently close together to yield high quality results, because the time synchronization between the high quality sound 23 and the motion picture being seen will always be within 1/10th of a second. Actually, the synchronization will be within much less than this 1/10th second for most of the time, because the CPU is continually acting in a direction to cause the near-zero cumulative difference stored in the particular current "marker" memory storage location D to approach zero, meaning that progressively closer synchronization is being provided, until such time as the occurrence of the next film-splice break due to missing frames.

Figure 6:
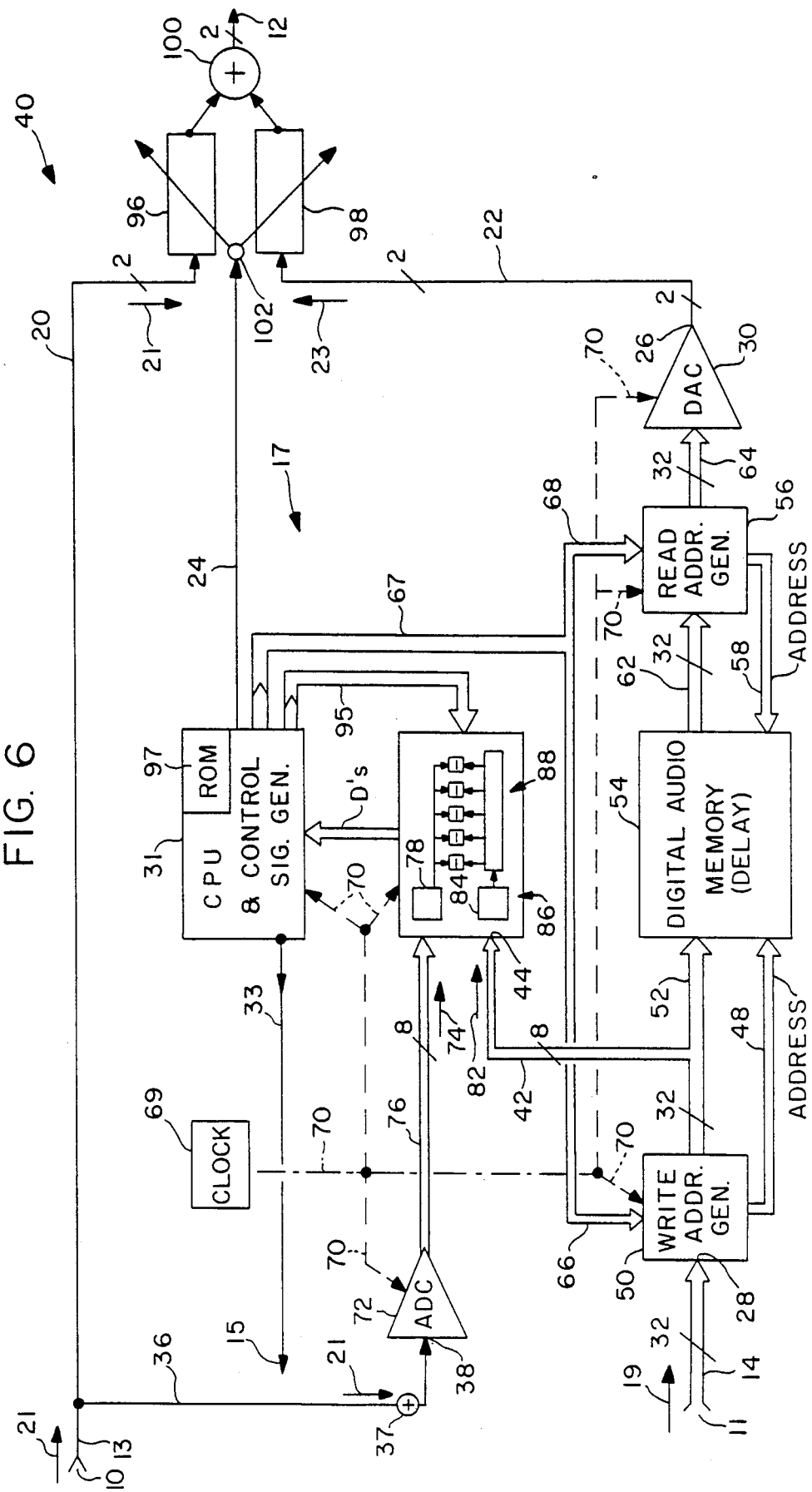
FIG. 6. is a functional block diagram of the entire synchronization method and system shown in FIG. 1, except that FIG. 6 shows more details of the entire system, as will be better understood after considering the details of the various components and their functions as explained in connection with the intervening FIGs. 2 through 5.

The CPU 31 controls the entire synchronization system 40 (FIG. 1 or FIG. 6). Thus, this CPU examines all of the cumulative correlator differences stored in memory locations D1 . . . Dn, chooses the appropriate pointer location, controls the read address generator 56 (FIG. 2) in the digital audio delay line system 18. In addition the CPU continues to update the write address generator 50. Concurrently, the CPU runs the low complexity delay line 92 (i.e. runs the FIFO overwriting memory store system 114 which serves as this delay line 92). At all times the CPU is providing control signals over the command path 33 to control operation of the auxiliary high quality digital sound signal source. The CPU provides control signals over the command path 24 for placing and keeping the fader 16 in the appropriate modes.

Also, the CPU includes read-only memory storage containing the protocols of the start and stop routines and timing sequences for the operation of the entire synchronization system 40 (FIGS. 1 and 6) including operation of the auxiliary digital sound storage medium, These start and stop routines and timing sequences in the CPU 31 are invoked by appropriate mechanical controls (not shown), as may be desired.

SMOOTH TRANSITION FADER SWITCH

FIG. 4 shows the components of the smooth transition fader switch system 16. The ordinary quality sound signal connection 20 from the analog source feeds ordinary quality analog sound signal 21 into a first variable gain element 96. The high quality analog sound signal 23 is fed over the connection 22 to a second variable gain element 98. These two variable gain elements 96 and 98 are identical and have respective output connections 97 and 99 to an adder 100 whose output connection 12 feeds either the signal 21 or 23 to the theater's sound system.

These variable gain elements 96 and 98 are, for example, volume controls ganged together and driven in opposing directions by a reversible drive motor 102. Control signals fed over the command connection 24 cause the drive motor 102 to turn for a predetermined increment in one direction or the other for increasing the volume of the appropriate signal 23 or 21 while simultaneously decreasing the volume of the other of these signals.

In FIG. 5 are shown the voltage gain output characteristics 104 and 106 of these two variable gain elements 96 and 98, respectively. These gain characteristics are plotted versus time as normalized curves in FIG. 5, and thus a value of unity equals full gain output. For example, the interval of time from the time point 108 to the time point 110 is predetermined to be one quarter of a second.

As an example for further explaining operation of the fader 16 (FIG. 4) assume that a close sequence of film splices has just been encountered involving missing frames whose cumulative time interval happens to exceed the delay time capability of the synchronization system 40. Consequently, at the time instant 108 a switch command is given via connection 24 for changing the sound signal on the stereo output connection 12 from the high quality signal 23 to the ordinary quality signal 21, while at this time point 108 the synchronization system 40 begins operating in its "synch search" mode as explained previously. The crossover point 112 of these two curves is at normalized gain of 0.707. Thus, in one eighth of a second after the switchover command has been given, the ordinary sound signal 21 is the audio message effectively being heard by the audience. As soon as synchronism has become re-established, a command signal given via connection 24 causes the fader system 16 to switch back to feed the high quality signal 23 to the stereo output connection 12. The gain characteristics 106 and 104 have the same shape when switching back to high quality sound, and so in one-eighth of second after a switch back command, the audio message effectively heard by the audience is the high quality sound.

In order to smooth out these transitions between high/ordinary and ordinary/high quality sound, an electronic adder 100 is interposed between the variable gain output connections 97 and 99 and the final stereo output connection 2. During the switchover time interval from time point 108 to time point 110, this adder 100 contains at the same time both of the audio signals 23 and 21 at their respective reduced levels as shown by the respective curves 106 and 104. These curves 106 and 104 are shaped so that their gain levels as combined at each instant by the adder 100 during switchover effectively maintains unity acoustical power level as heard by the audience.

It is to be understood that with an appropriately long predetermined delay time storage capability in the synchronization system 40, for example in the presently preferred range of about 8 to 10 seconds as explained, then the occurrence of switching of the fader 16 during showing of a cinema film will be infrequent for standard used release prints.

FIG. 6 shows the entire synchronization system 40 in greater detail than FIG. 1. It is believed that this detailed presentation in FIG. 6 will be more easily understood and appreciated after considering FIGS. 1-5 and the detailed description relating to those FIGURES.

Method, system and apparatus embodying the present invention will now be described with reference to FIGS. 7A and 7B for providing one or more translation sound tracks synchronized to a motion picture film, video tape or other motion picture source having a conventional sound track of ordinary quality containing a spoken language (the "original language") different from the language in each translation sound track.

In FIG. 7A is seen a motion picture source 120, for example, a conventional motion picture projector 122 in a theater projection room running a conventional cinema film 124 (for example a standard motion picture theater release print). The film 124 passes an optical aperture 126 for projecting light images 128 toward a viewing screen (not shown). The film also passes a sound track transducer 130. There is a conventional sound track on the film 124. As described in the BACKGROUND, the sound track is conventionally offset along the length of the film 124 from the specific frames to which the sound track relates by an "offset distance" equal to the length of the normal film path distance in the projector 122 between the optical aperture 126 and the transducer 130. This transducer 130 provides the ordinary sound signal 21 being fed via line 13' to the input connection 10 in FIG. 7B.

The projector 122 is arranged for remote control, and a control interface unit 132 is connected through a control buss 134 with the projector for automatic operation. The control interface unit 132 is connected through another control buss 136 with an auxiliary sound signal source 140 of higher sound quality than the ordinary sound signal 21. This auxiliary sound signal source 140 is a high quality sound playback system, such as a compact disc (CD) player, rotary head digital audio tape (R-DAT) player, video cassette adapter system (Sony model F-1 or PCM-1600 series) or a digital audio stationary head machine (DASH).

This auxiliary sound signal source includes a prime language channel 142 containing the same audio message as the sound track on the film except that the prime language channel 142 is preferred to be of higher quality. The prime language channel was made from the same master recording as was used to make the sound track on the film. Thus, the spoken language in the prime language channel 142 is the same as in the sound track on the film 124, for example being the English language. The sound signals 19 from this prime channel 142 are fed via line 14' to the input connection 11 in FIG. 7B.

The correlation system 17 in FIG. 7B controls the interface unit 132 (FIG. 7A) through the control buss 33 and is controlling the digital delay line system 18. Consequently, the synchronism system 40A in FIG. 7B serves to keep the higher quality (converted digital signal) sound signal 23 at the output 26 of the digital delay line system 18 synchronized with the ordinary sound signal 21 in the same manner as the synchronism system 40 described above with reference to FIGS. 1-6.

The auxiliary sound source 140 includes translation sound channels 144, 146, 148, each containing another spoken language different from the language in the prime language channel 142. For example, these other spoken languages may be French, German, Italian, Spanish, Chinese, Russian, Portuguese, etc. In other words, each of these translation sound channels respectively comprises for example, two tracks for stereo French, two tracks for stereo German, two tracks for stereo Italian, and so forth.

The prime language channel 142 may include two tracks for stereo English, and may include two or more tracks for stereo presentation of other sounds including music, and two tracks may be included for "surround sound" for use in those particular theaters equipped to utilize surround sound. These various language channels including the prime language channel are all running in synchronization. For example, these language channels 144, 146, 148 are running in parallel relationship with the prime channel 142, and consequently all of these channels are running synchronously. Thus, the different spoken languages and the other sounds, including "surround sound", are all available to be used for presentation to a theater audience desiring to hear a particular language or for presentation to various segments of a theater audience sitting in areas pre-assigned for respective particular languages and equipped with appropriate listening devices. The other sounds, including "surround sound" may be electronically added to the particular language so that the viewer can hear the entire intended sound track.

It is to be understood that the translation language in any of the channels 144, 146, or 148 may be provided on a monaural track rather than being provided on stereo L and R tracks. The spoken language in each of the various translation language channels 144, 146, 148 is arranged and timed in its stereo or monaural medium so that the lip motions of the persons seen by a viewer of the projected images 128, who are speaking English, for example, generally appear to correspond with the articulation of the translation spoken language to be heard by the viewer.

The respective translation language channels 144, 146, 148 in the auxiliary sound signal source 140 are connected as indicated at 14A, 14B and 14C to the respective input ends 28A, 28B, and 28C of the second, third, and Nth digital delay line systems 18A, 18B, and 18C, respectively, and thus the digital data for these respective spoken translations are present in these respective delay line systems 18A, 18B and 18C. These delay lines 18A, 18B and 18C are slaved to the prime delay line system 18. Consequently, the digital data for the spoken translations in these respective delay line systems 18A, 18B, and 18C are synchronized with the digital data for the prime language in the prime delay line 18 and thus with the ordinary sound signal input 21 originating from the sound track on the film 124.

A language channel selection switch 150 enables selection of the particular spoken language desired to be heard while viewing the projected images. The analog sound signal 23A, 23B, or 23C available at the respective output terminals 26A, 26B, or 26C includes the other sounds, music, "surround sound" and other sound effects along with the spoken translation language. Therefore, when the arm 155 of the channel selector switch 150 is in the respective positions for connecting the contact 151, 152, 153, or 154 to the output supply line 22, a high quality analog sound signal 23, 23A, 23B, or 23C containing the prime spoken language or a translation thereof, as may be desired, is fed out through the supply line 22. The signal 23 includes the prime spoken language, say English, plus all of the other sounds. The signal 23A includes the second spoken language, say French, plus all of the other sounds. The signal 23B includes the third spoken language, say German, plus all of the other sounds. The signal 23C includes the Nth spoken language plus all of the other sounds.

In connection with the synchronization system 40, it was explained that when there is a motion picture film splice involving missing picture frames, there is an immediate and automatic "cross fade" over to the lower quality sound track on the film, so as to continue the continuity of the sound presentation to the audience, while a "search mode" immediately commences for re-establishing synchronization with the higher quality sound. As soon as synchronization is quickly obtained, there is an immediate and automatic cross fade back to the higher quality sound. This is very unlikely or improbable occurrence, because there are 8 to 10 seconds of storage in each delay line system 18A, 18B, or 18C.

If the higher quality sound being presented to the audience includes a translational track presentation of a second language, then such an unlikely automatic cross fade to the lower quality track would inherently cause the audience to suddenly begin hearing words being spoken in the prime language, which sudden change to a different language might be unsettling or unattractive to the audience. Thus the second half of the automatic cross fade can be blanked out when a translational track is being presented. Then, if there happens to be a temporary loss of synchronization due to a film splice with missing picture frames, there is a half fade (decrease in volume) into a brief period of silence until synchronization is quickly restored and then another half fade (increase in volume) back to the original sound level.

Moreover, the central processing unit in the correlation system 17 may include a routine for keeping a record of those few instances where a temporary loss of synchronization occurred. Then, the next time that the film 124 is projected, the synchronization system 17 produces an automatic "fast dump" (a fast over-writing) of digital sound signal data into the front ends of the respective delay line systems 18, 18A, 18B, 18C. This automatic fast dump is programmed to take place at about the time when the troublesome film splice reaches the optical aperture 126. Then, the program quickly causes the read address point 32 to jump ahead to the newly installed data near the front end of the delay lines resulting from the fast dump. Thus re-synchronization is automatically obtained by the time that the troublesome splice has reached the transducer 130. In other words, re-synchronization has automatically advantageously been obtained within the normal time for the offset sound track on the film to travel the normal distance from projection aperture 126 to the sound transducer 130.

In the event that the prime language channel 142 in FIG. 7A includes sound channels for stereo sound effects, music or surround sound, then the buss 14', 14 may include more than 32 parallel communication lines, as will be understood by those skilled in the art. Thus, the present invention is not limited to the handling of two-channel stereo with L and R sixteen-bit parallel words. The method, system and apparatus of this invention also can be applied to advantage for handling of monaural sound signals and also for handling multichannel "surround" stereo system sound, which may involve 4-channel or 6-channel output connections instead of the two-channel output signal supply lines 20 and 22, depending upon the desired loudspeaker and amplifier arrangements in various theaters. In other words, the embodiments of this invention are very flexible and broad in scope with respect to their adaptability to various theater or home viewing installations.

Figure 8:
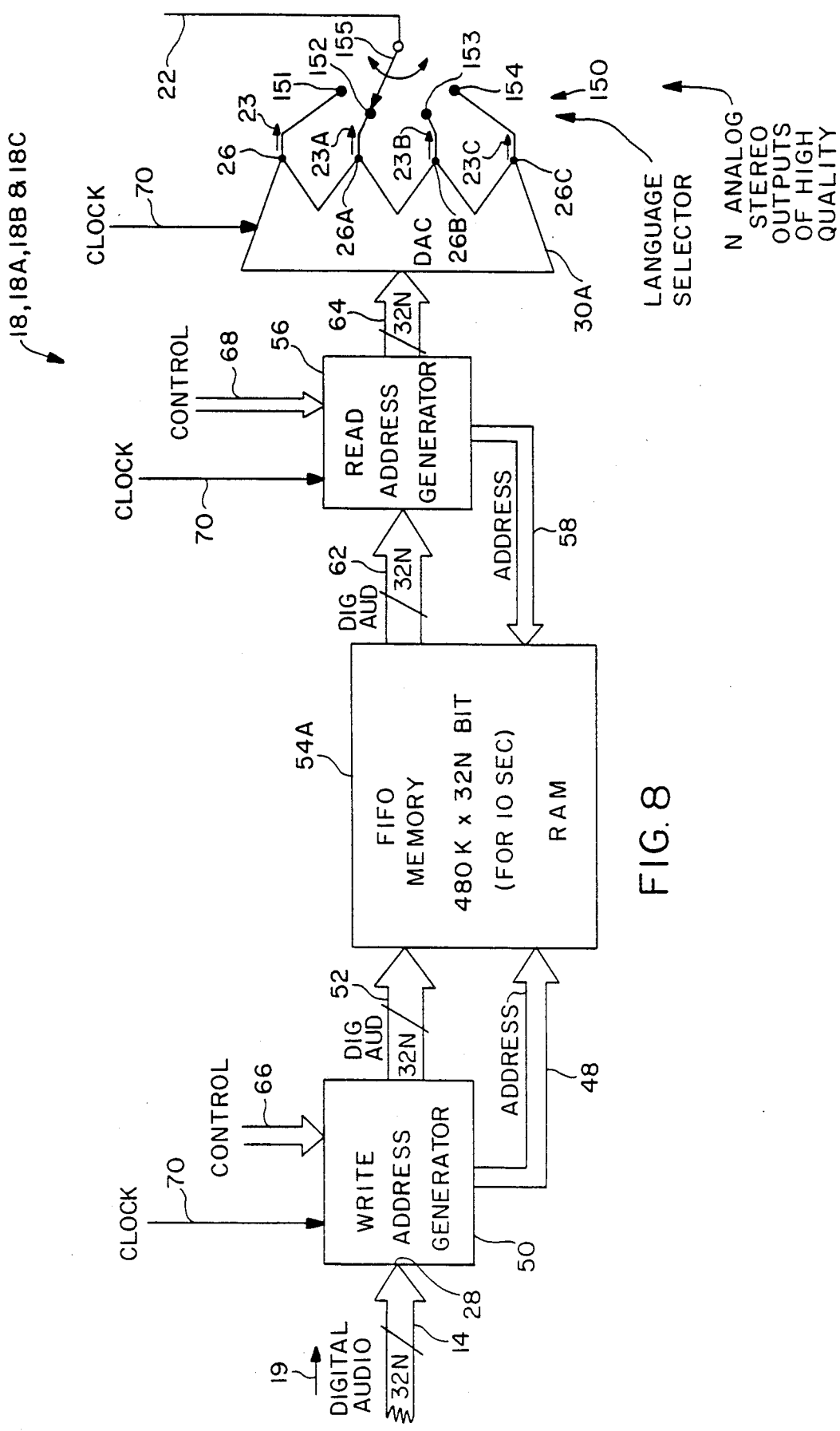
FIG. 8 shows a functional block diagram, similar to FIG. 2, of a preferred digital delay line system for use in the synchronizing system 40 shown in FIG. 7B. This digital delay line system in FIG. 8 includes a first-in first-out overwriting memory store, for accommodating "N" language channels and having a language selector switch at the output, as also shown in FIG. 7B.

FIG. 8 shows a functional block diagram, similar to FIG. 2, of a preferred digital delay line system commonly called a FIFO, or first-in first-out overwriting memory store, for accommodating "N" language channels. Thus, the digital delay line system of FIG. 8 comprises the prime delay line system 18 (FIG. 2) plus the second, third, and Nth delay line systems 18A, 18B, and 18C. Consequently, the FIFO overwriting memory store 54 A of FIG. 8 handles the digital data from the prime language channel 142 of FIG. 7A plus the digital data from the translation language channels 144, 146, and 148.

The number of parallel communication lines for each connection, i.e. for each buss or communication pathway, is increased from the "32" shown for FIG. 2 to 32N for handling L and R digital audio signals each as 16-bit parallel words from the N language channels 142, 144, 146 and 148 in FIG. 7A. (For those skilled in the art, the handling of digital signals in a parallel mode can be replaced by a serial mode. In this case a single buss would handle N 32 bit serial words)

The digital-to-analog converter 30A has N analog stereo outputs 26, 26A, 26B and 26C for high quality sound signals 23, 23A, 23B, or 23C, depending upon the particular language channel being heard by the audience.

The FIFO overwriting memory store 54A is now at least 480 times 32N bits as indicated for handling the various language channels 142, 144, 146 and 148.

As various possible embodiments of the present invention may be made for synchronizing a higher quality audio sound signal with another audio sound signal containing the same audio message without departing from the scope of this invention, it is to be understood that all matter set forth in the description and shown in the drawings is for the purpose of illustrating and teaching the invention and is not intended to be exhaustive of its many features which will be seen by those skilled in the art in view of this disclosure. For example, the ordinary sound signal source may be made from a "master recording" or a high quality duplication of this "master recording". Similarly, the high quality digital signal source may be made from the "master recording" or a high quality duplication of this "master recording". Thus the term "original source" or "master recording" is to be interpreted sufficiently broadly to include high quality duplications thereof which contain the same audio message, i.e. which have essentially the same audio informational content.

We claim:

1. A system for providing viewable images depicting motion wherein persons are seen talking, said images having a sound track associated therewith for providing an audio signal carrying an audio message synchronized with such motion including a first spoken language synchronized with lip motions of persons depicted talking by said, said first sound track having been derived from a master recording or high quality duplicate thereof, said system enabling a viewer of said images selectively to hear sound reproduced from either of at least two language channels for selectively listening to at least a second or third spoken language associated with said viewable images, said system comprising:

auxiliary sound signal means including a prime language channel and at least second and third language channels;

said second and third language channels running in synchronization with said prime language channel;

said prime language channel having an audio message derived from said master recording or high quality duplicate thereof for providing an audio signal carrying the audio message including said first spoken language;

said second and third language channels having second and third audio messages which were recorded using second and third spoken languages, respectively;

said second and third spoken languages being translations of said first spoken language and being arranged and timed as recorded in said second and third language channels, respectively, for providing second and third audio signals carrying said second and third audio messages capable of enabling lip motions of persons depicted by said images generally to appear to correspond with articulation of the respective second or third spoken language in the respective second or third audio message;

correlation means for correlating intrinsic characteristics of the audio message carried by said audio signal provided by said prime language channel with intrinsic characteristics of the audio message carried by the audio signal provided by said sound track for synchronizing the audio signal provided by said prime language channel with the audio signal provided by said sound track; and selection means for enabling a viewer selectively to listen to the second or third audio message carried by said second or third audio signals, respectively, as said second and third language channels are running in synchronization with said prime language channel;

thereby enabling a viewer of said images depicting motion selectively to listen to a second or third spoken language in the respective second or third audio message with lip motions of persons depicted by said images generally appearing to correspond with articulation of the respective second or third spoken language.

2. A system as claimed in claim 1, in which:

a discontinuity may occur in said viewable images and in said sound track which may cause a discontinuous forward jump in real time of motion and talking being depicted and also cause a forward jump in real time of the audio signal being provided by said sound track;

said discontinuity causing a temporary loss in synchronizing of the audio signal provided by said prime language channel with the audio signal being provided by said sound track thereby causing a temporary loss in generally appearing correspondence between lip motions of persons depicted by said images and articulation of the respective second and third spoken languages in the respective second and third audio messages carried by the respective second and third audio signals being provided by said second and third language channels running in synchronization with said prime language channel;

said correlation means reestablishes synchronizing of the audio signal provided by said prime language channel with the audio signal provided by said sound track by searching forward in the audio message carried by the audio signal provided by the prime language channel for reestablishing correlation of intrinsic characteristics of the audio message carried by said audio signal provided by the prime language channel with intrinsic characteristics of the audio message carried by said audio signal being provided by the sound track; and said reestablishing of synchronizing thereby produces generally appearing correspondence between lip motions of persons depicted by said images and articulation of the respective second and third spoken languages in the respective second and third audio messages carried by the respective second and third audio signals being provided by said second and third language channels running in synchronization with said prime language channel.

3. A system as claimed in claim 2, further comprising:

means in said correlation means for keeping a record of each instance where temporary loss of synchronizing occurred due to such a discontinuity for providing fast re-synchronizing after occurrence of such a discontinuity during subsequent presentation of the viewable images by jumping forward in the audio message carried by the audio signal provided by said prime language channel;

said jumping forward being controlled in response to said record keeping means in said correlation means for arriving at a place at which intrinsic characteristics of said audio message carried by the audio signal provided by said prime language channel correlate with intrinsic characteristics of the audio message carried by said audio signal being provided by said sound track after such a discontinuity; and simultaneously also correspondingly jumping forward in the second and third audio messages carried by the respective second and third audio signals being provided by said second and third language channels running in synchronization with said prime language channel;

thereby also providing fast re-synchronizing of articulation of the respective second and third spoken languages in the respective second and third audio massages with lip motions of persons being depicted by said images after occurrence of such a discontinuity.

4. For use with a system for providing an audience with viewable images depicting motion wherein persons are depicted talking, said viewable images being derived from a picture source having an associated sound signal track for providing a first sound signal synchronized in real time with the viewed images for reproducing a first audio message including a first spoken language synchronized in real time with lip motions of persons depicted talking by the images, said sound signal track having been derived from a master recording or high quality duplicate thereof, apparatus comprising:

an auxiliary digital sound signal source having a prime language channel for providing a second sound signal for producing a second audio message including said first spoken language, said prime language channel having been derived from said master recording or high quality duplicate thereof;

means for correlating intrinsic characteristics of said second audio message with intrinsic characteristics of said first audio message for synchronizing said second sound signal in real time with said first sound signal for causing said second audio message to be synchronized in real time with the viewed images, with said first spoken language in said second audio message being synchronized in real time with lip motions of persons depicted talking by the images;

said auxiliary digital sound signal source also comprising at least one translation language channel for providing a third sound signal for reproducing a third audio message including a second spoken language different from and being a translation of said first spoken language;

said second spoken language in said third audio message being arranged and timed for enabling articulation of said second spoken language to appear generally to correspond in real time with lip motions of persons depicted talking by the images;

said translation channel running in synchronism with said prime language channel for synchronizing of said second sound signal in real time with said first sound signal to cause said third sound signal to be synchronized in real time with said first sound signal, with articulation of said second spoken language appearing generally to correspond with lip motions of persons depicted talking by the images; and means accessible to the audience for enabling members of the audience to select to hear said first spoken language or said second spoken language during viewing of said images depicting motion.

5. Apparatus as claimed in claim 4, in which:

said means accessible to the audience for enabling members of the audience to select to hear said first spoken language or said second spoken language during viewing of said images depicting motion include selector means in communication with said prime language channel and in communication with said translation language channel;

said selector means being in communication with sound transducer means to be heard by members of an audience viewing said images;

said selector means being selectively conditionable for supplying either said second or third sound signal to said sound transducer means for enabling members of the audience to hear either said second or third audio message, with said first spoken language being synchronized in real time with lip motions of persons depicted talking by the viewed images and with articulation of said second spoken language appearing generally to correspond with lip motions of persons depicted talking by the viewed images.

6. Apparatus as claimed in claim 4, in which:

said auxiliary digital sound signal source comprises said prime language channel and a plurality of translation language channels for providing a plurality of sound signals for reproducing a plurality of audio messages, the respective audio messages of said plurality of audio messages include respective spoken languages different from each other and each being a translation of said first spoken language;

each spoken language in each respective audio message is arranged and timed for enabling articulation thereof to appear generally to correspond in real time with lip motions of persons depicted talking by said images;

said translation language channels all run in synchronism with said prime language channel for causing said plurality of sound signals each to be synchronized in real time with said second sound signal and thereby to be synchronized in real time with said first sound signal, whereby each of said plurality of audio messages is synchronized in real time with said first audio message and thereby available to be selected for hearing by an audience viewing said images with lip motions of persons depicted talking by said images appearing generally to correspond in real time with articulation of each spoken language.

7. In a system providing an audience with viewable images depicting motion and wherein a sound signal track is associated with a source of said viewable images for providing a first sound signal synchronized in real time with said viewable images for reproducing a first audio message including a first spoken language synchronized in real time with lip motions of persons depicted talking by said images, a method for providing at least one other audio message synchronized in real time with said viewable images and including a second spoken language being a translation of said first spoken language, with articulation of said second spoken language appearing generally to correspond with lip motions of persons depicted talking by said images, said method comprising the steps of:

providing an auxiliary digital sound signal source having a prime language channel and at least one translation language channel, recording in said prime language channel a second sound signal made from a master recording or high quality duplicate thereof corresponding with a master recording or high quality duplicate thereof from which said sound signal track was made for enabling said prime language channel to be used for reproducing the first audio message including the first spoken language, with informational content of the first audio message reproduced from said prime language channel being the same as informational content of the first audio message reproduced from said sound signal track, except for higher sound quality being reproducible from said prime language channel;

recording in said translation channel a third sound signal for reproducing a second audio message including a second spoken language which is a translation of said first spoken language and wherein articulation of said second spoken language is arranged and timed for corresponding generally in real time with lip motions depicted in said viewable images;

operating said auxiliary sound signal source with said translation channel running in synchronism in real time with said prime language channel;

reproducing said second sound signal from said prime language channel;

reproducing said third sound signal from said translation channel;

synchronizing said second sound signal in real time with said first sound signal by correlating informational content of said second sound signal with the same informational content of said first sound signal;

thereby synchronizing in real time the first audio message reproduced from said prime language channel with the first audio message reproduced from said sound signal track;

thereby causing the third sound signal reproduced from said translation language channel running in synchronism in real time with said prime language channel also to be synchronized in real time with the first audio message reproduced from said sound signal track for causing articulation of the spoken second language to correspond generally in real time with the lip motions depicted in said viewable images; and selecting to be heard by the audience the first audio message reproduced from said prime language channel or the second audio message reproduced from said translation language channel, depending upon a desire by the audience to hear said first spoken language or said second spoken language.

8. A method as claimed in claim 7, comprising the further step of:

enabling each member of the audience individually to select to be heard by each member the first audio message or the second audio message.

9. A method as claimed in claim 7, comprising the further step of:

providing an auxiliary digital sound signal source having a prime language channel and a plurality of translation language channels;

recording in respective translation channels of said plurality of translation channels respective sound signals for reproducing respective audio messages each including a spoken language which is different from spoken languages in respective audio messages reproduced from other translation channels of said plurality of translation channels;

said spoken languages in the audio messages reproduced from the translation channels being translations of said first spoken language;

arranging and timing said spoken languages in said audio messages for articulation of each of said spoken languages to correspond generally in real time with lip motions depicted in said viewable images;

operating said auxiliary sound signal source with said plurality of translation channels all running in synchronization in real time with said prime language channel;

reproducing the respective sound signals from the respective translation channels;

thereby causing the respective audio messages reproduced from the respective translation channels all running in synchronization in real time with said prime language channel also to be synchronized in real time with the first audio message reproduced from said sound track for causing articulation of each of said spoken languages to correspond generally in real time with the lip motions depicted in said viewable images; and selecting to be heard by the audience the first audio message reproduced from said prime language channel or any of the respective audio messages reproduced from the respective translation channels.

10. A method as claimed in claim 9, comprising the further step of:

enabling each member of the audience individually to select to be heard by each member the first audio message or any of the audio messages reproduced from the respective translation channels.

11. The method as claimed in claim 9, comprising the further step of:

providing pre-selectable seating areas for an audience having listening devices assigned to predetermined languages for reproducing respective audio messages in said seating areas including respective predetermined assigned languages;

whereby individual members of the audience can select among seating areas in accordance with a particular spoken language desired to be heard;

thereby enabling all members of the audience to see the same viewable images depicting motion, while each individual member of the audience is hearing an audio message including a desired spoken language and wherein articulation of respective spoken languages heard by individual members generally corresponds with lip motions depicted by said viewable images.

12. The method as claimed in claim 9, comprising the further step of:

providing listening devices to members of an audience for individual members of the audience to select an audio message including a desired spoken language;

thereby enabling all members of the audience to see the same viewable images depicting motion, while each individual member of the audience is hearing an audio message including a desired spoken language and wherein articulation of respective spoken languages heard by individual members generally corresponds with lip motions depicted by said viewable images.

13. In a system providing an audience with viewable images depicting motion and wherein a sound signal track is associated with a source of said viewable images for providing a first sound signal synchronized in real time with said viewable images for reproducing a first audio message including a first spoken language synchronized in real time with lip motions of persons depicted talking by said images, apparatus for providing at least one other audio message synchronized in real time with said viewable images and including a second spoken language which is a translation of said first spoken language, with articulation of said second spoken language appearing generally to correspond with lip motions of persons depicted talking by said images, said apparatus comprising:

auxiliary digital sound signal source means having a prime language channel and at least one translation language channel, said prime language channel having recorded therein a second sound signal made from a master recording or high quality duplicate thereof corresponding with a master recording or high quality duplicate thereof from which said sound signal track was made for enabling said prime language channel to be used for reproducing the first audio message including the first spoken language, with informational content of the first audio message reproduced from said prime language channel being the same as informational content of the first audio message reproduced from said sound signal track, except for higher sound quality being reproducible from said prime language channel;

said translation channel having recorded therein a third sound signal for reproducing a second audio message including a second spoken language which is a translation of said first spoken language and wherein articulation of said second spoken language is arranged and timed for corresponding generally in real time with lip motions depicted in said viewable images;

said auxiliary sound signal source means operating with said translation channel running in synchronization in real time with said prime language channel;

means for reproducing said second sound signal from said prime language channel;

means for reproducing said third sound signal from said translation channel;

correlation means for synchronizing said second sound signal in real time with said first sound signal by correlating intrinsic characteristics of said second sound signal with intrinsic characteristics of said first sound signal;

thereby synchronizing in real time the first audio message reproduced from said prime language channel with the first audio message reproduced from said sound signal track;

thereby providing the third sound signal reproduced from said translation language channel synchronized in real time with the first audio message reproduced from said sound signal track with articulation of the spoken second language corresponding generally in real time with the lip motions depicted in said viewable images; and means for selecting to be heard by the audience the first audio message reproduced from said prime language channel or the second audio message reproduced from said translation language channel, depending upon a desire by the audience to hear said first spoken language or said second spoken language.

14. Apparatus as claimed in claim 13, further comprising:

means for enabling each member of the audience individually to select to be heard by each member the first audio message or the second audio message.

15. Apparatus as claimed in claim 13, in which:

said auxiliary digital sound signal source means have a prime language channel and a plurality of translation language channels;

respective translation channels of said plurality of translation channels having recorded therein respective sound signals for reproducing respective audio messages each including a spoken language which is different from spoken languages in respective audio messages reproduced from other translation channels of said plurality of translation channels;

said spoken languages in the audio messages reproduced from the translation channels being translations of said first spoken language;

said spoken languages in said audio messages being arranged and timed for articulation of each of said spoken languages to correspond generally in real time with lip motions depicted in said viewable images;

said auxiliary sound signal source means operating with said plurality of translation channels all running in synchronization in real time with said prime language channel;

means for reproducing the respective sound signals from the respective translation channels;

thereby causing the respective audio messages reproduced from the respective translation channels all running in synchronization in real time with said prime language channel also to be synchronized in real time with the first audio message reproduced from said sound track for causing articulation of each of said spoken languages to correspond generally in real time with the lip motions depicted in said viewable images; and means for selecting to be heard by the audience the first audio message reproduced from said prime language channel or any of the respective audio messages reproduced from the respectable translation channels.

16. Apparatus as claimed in claim 15, further comprising:

means for enabling each member of the audience individually to select to be heard by each member the first audio message or any of the audio messages produced from the respective translation channels.

17. Apparatus as claimed in claim 15, further comprising:

pre-selectable seating areas for an audience;

said seating areas having listening devices assigned to predetermined languages for reproducing respective audio messages in said seating areas including respective predetermined assigned languages;

whereby individual members of the audience can select among seating areas in accordance with a spoken language desired to be heard;

thereby enabling all members of the audience to see the same viewable images depicting motion, while each individual member of the audience is hearing an audio message including a desired spoken language and wherein articulation of respective spoken languages heard by individual members generally corresponds with lip motions depicted by said viewable images.

18. Apparatus as claimed in claim 15, further comprising:

listening devices available to members of an audience for enabling individual members of the audience to select an audio message including a desired spoken language;

thereby enabling all members of the audience to see the same viewable images depicting motion, while each individual member of the audience is hearing an audio message including a desired spoken language and wherein articulation of respective spoken languages heard by individual members generally corresponds with lip motions depicted by said viewable images.

19. For use in providing an audience with viewable images accompanied by sound, said viewable images being provided from a motion picture film, said viewable images showing people moving and talking and said motion picture film having at least one sound signal track on the film for reproducing a first audio message including a first spoken language synchronized with lip motions of people shown talking and wherein correlation means synchronize an audio message from auxiliary sound signal source means with said first audio message, a system for providing an audience with an audio message selectable from among audio messages each including a spoken language different from said first spoken language and different from each other and wherein lip motions of people shown talking generally appear to correspond with articulation of such different spoken language, said system comprising:

auxiliary sound signal source means having a plurality of sound signal channels;

one of said sound signal channels being a prime channel having recorded therein an audio message including said first spoken language;

said audio message recorded in said prime channel having been derived from a master recording or high quality duplicate of a master recording from which was derived said sound signal track on the motion picture film;

said correlation means correlating said audio message of said prime channel with said first audio message for synchronizing said audio message of said prime channel with said first audio message;

other sound signal channels of said auxiliary sound signal source means being translation channels;

said translation channels having recorded therein respective audio messages including spoken languages which are different from each other and different from said first spoken language;

each respective spoken language in a respective audio message of a respective translation channel having been arranged and timed for lip motions of people shown talking generally to appear to correspond with articulation of the respective spoken language in the respective audio message reproducible from the respective translation channel;

said translation channels being synchronizable with said prime channel; and language selection means for selection of an audio message from a translation channel to be heard by an audience while viewing the images.

20. For use in providing an audience with viewable images accompanied by sound, a system as claimed in claim 19, further comprising a plurality of digital delay means associated respectively with said plurality of sound signal channels.

21. For use in providing an audience with viewable images accompanied by sound, a system as claimed in claim 20, in which:

one of said digital delay means comprises prime delay means;

said prime delay means are associated with said prime channel; and digital data for respective different spoken languages in said plurality of digital delay means are slaved to digital data for said first spoken language in said prime channel.

22. For use in providing an audience with viewable images accompanied by sound, a system as claimed in claim 20, in which:

one of said digital delay means comprises prime delay means;

said prime delay means are associated with said prime language channel; and digital data for respective spoken languages in said plurality of digital delay means are synchronized with digital data for said first spoken language in said prime channel.

23. For use in providing an audience with viewable images accompanied by sound, a system as claimed in claim 20, in which:

digital to analog conversion means are associated with said plurality of digital delay means; and said language selection means are associated with said digital to analog conversion means.

24. For use in providing an audience with viewable images accompanied by sound, a system as claimed in claim 19, in which:

at least one of said translation channels comprises at least two tracks for providing an audio message including a stereo presentation of a spoken language different from said first spoken language.

25. For use in providing an audience with viewable images accompanied by sound, a system as claimed in claim 20, in which:

said plurality of digital delay means comprise first-in first-out overwriting memory storage means;

digital to analog conversion means are associated with said plurality of digital delay means; and said language selection means are associated with said digital to analog conversion means.

26. For use in providing an audience with viewable images accompanied by sound, a system as claimed in claim 19 and wherein the motion picture film may include a film splice involving missing picture frames causing momentary loss of synchronization of said auxiliary signal source means with said first audio message, and wherein cross fading means are provided for reproducing said first audio message until synchronization is restored following an encounter with such a film splice, in which:

said cross fading means automatically half fades into a brief period of silence until synchronization is restored when the audience is hearing reproduction of an audio message from one of said translation channels.

27. For use in providing an audience with viewable images accompanied by sound, a system as claimed in claim 19, in which:

digital delay means are associated with said plurality of sound signal channels; and said digital delay means comprise first-in first-out overwriting memory storage means.

28. For use in providing an audience with viewable images accompanied by sound, a system as claimed in claim 19, in which:

digital delay means associated with said prime channel and with said translation channels; and said digital delay means handling digital data from the prime language channel and digital data from the translation channels.

29. For use in providing an audience with viewable images accompanies by sound, a system as claimed in claim 28, in which:

digital data for respective audio messages of respective translation channels in said digital delay means are slaved to digital data for the audio message of said prime channel.

30. For use in providing an audience with viewable images accompanied by sound, a system as claimed in claim 19, in which:

said translation channels are running in parallel relationship with said prime channel for running in synchronization in real time with said prime channel.

31. For use in a system for providing an audience with viewable images accompanied by sound, said viewable images being provided from a motion picture film, said viewable images showing people talking and said motion picture film having at least one sound signal track for providing a first audio message including a first spoken language wherein articulation is synchronized with lip motions of people shown talking and wherein correlation means synchronize an audio message from auxiliary sound signal source means with said first audio message, apparatus for providing an audience with an audio message including a second spoken language different from said first spoken language and wherein lip motions of people shown talking generally appear to correspond with articulation of second spoken language, said apparatus comprising:

auxiliary sound signal source means including a plurality of sound signal channels;

one of said sound signal channels being a prime language channel;

said prime language channel having recorded therein an audio message derived from a master recording or high quality duplicate of a master recording from which was derived said sound signal track;

said correlation means correlating said audio message of said prime language channel with said first audio message for synchronizing said audio message of said prime language channel with said first audio message while an audience is provided with said viewable images;

another of said sound signal channels being a second language channel;

said second language channel having recorded therein an audio message including a second spoken language different from said first spoken language;

said second spoken language being arranged and timed during recording for lip motions of people shown talking by said viewable images generally to appear to correspond with articulation of said second spoken language;

said audio message of said second language channel being synchronized with said audio message of said prime language channel while an audience is provided with said viewable images; and means for providing an audience with said audio message of said second language channel for an audience to see said viewable images while hearing the audio message from said second language channel wherein lip motions of people shown talking by said viewable images generally appear to correspond with articulation of said second spoken language heard by the audience.

32. For use in a system for providing an audience with viewable images accompanied by sound, apparatus as claimed in claim 31, further comprising:

prime digital delay means associated with said prime language channel for receiving digital data therein relating to the audio message of said prime language channel;

said correlation means correlating digital data in said prime digital delay means with digital data relating to said first audio message;

second digital delay means associated with said second language channel for receiving digital data therein relating to the audio message of said second language channel;

digital data in said second digital delay means being synchronized with digital data in said prime digital data delay means;

said means for providing an audience with said audio message of said second language channel providing digital data from said second digital delay means corresponding with digital data of said prime digital delay means correlating with digital data relating to said first audio message; and said means for providing an audience with said audio message of said second language channel including digital to analog conversion means.

33. For use in a system for providing an audience with viewable images accompanied by sound, apparatus as claimed in claim 31, further comprising:

means for producing a fast dump of digital data from said prime language channel into said prime digital delay means in relation to a film splice and for producing a fast dump of digital data from said second language channel into said second digital delay means in relation to the film splice.

34. For use in a system for providing an audience with viewable images accompanied by sound, apparatus as claimed in claim 33, in which:

said prime digital delay means and said second digital delay means comprise first-in first-out overwriting memory storage means with write address means and read address means.

35. For use in a system for providing an audience with viewable images accompanied by sound, apparatus as claimed in claim 31, wherein:

said second language channel includes at least two tracks for stereo presentation to an audience of said audio message of said second language channel including stereo presentation of said second spoken language.

36. For use in a system for providing an audience with viewable images accompanied by sound, apparatus as claimed in claim 31, wherein:

said second language channel includes at least two tracks for stereo presentation to an audience of said second spoken language and of other sounds including music.

37. A method for presenting an audience with viewable images accompanied by sound, wherein said viewable images show people talking and wherein a source of said viewable images includes at least one sound signal track for providing a first audio message including a first spoken language having articulation synchronized with lip motions of people shown talking and wherein an audio message of an auxiliary source is correlatable with said first audio message for synchronizing said audio message of said auxiliary source with said first audio message, said audio message of said auxiliary source being derived from a master recording or high quality duplicate thereof from which was derived said sound signal track, said method presenting an audience with a second spoken language different from said first spoken language, said method comprising the steps of:

recording in a translation language channel said second audio message including said second spoken language;

said second spoken language in said second audio message being arranged and timed during recording for lip motions of people shown talking by said viewable images generally to appear to correspond with articulation of said second spoken language;

synchronizing said second audio message with said audio message of said auxiliary source during presenting of said viewable images; and providing an audience with said second audio message for an audience to see said viewable images while hearing said second audio message including said second spoken language with lip motions of people shown talking by said viewable images generally appearing to correspond with articulation of said second spoken language in said second audio message.

* * * * *